United States Patent
Countryman et al.

(10) Patent No.: US 6,952,575 B1
(45) Date of Patent: Oct. 4, 2005

(54) PREPAID CALL MANAGEMENT IN INTELLIGENT NETWORK

(75) Inventors: Elizabeth Countryman, Annapolis, MD (US); Timothy J. Lorello, Gambrills, MD (US); Mark Titus, Arnold, MD (US); Dara Ung, Odenton, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 450 days.

(21) Appl. No.: 09/533,805

(22) Filed: Mar. 23, 2000

Related U.S. Application Data

(60) Provisional application No. 60/185,053, filed on Feb. 25, 2000.

(51) Int. Cl.[7] .................................................. H04Q 7/00
(52) U.S. Cl. ........................................ 455/408; 455/445
(58) Field of Search ................................. 455/445, 414, 455/406, 408, 414.1, 414.2, 414.3

(56) References Cited

U.S. PATENT DOCUMENTS

| | | | |
|---|---|---|---|
| 5,351,235 A | 9/1994 | Lahtinen | 370/259 |
| 5,579,372 A | 11/1996 | Astrom | 455/412 |
| 5,592,535 A | 1/1997 | Klotz | 379/58 |
| 5,628,051 A | 5/1997 | Salin | 455/33.1 |
| 5,682,600 A | 10/1997 | Salin | 455/33.1 |
| 5,768,509 A | 6/1998 | Günlük | 395/200.33 |
| 5,787,357 A | 7/1998 | Salin | 455/466 |
| 5,794,142 A | 8/1998 | Vanttila et al. | 455/419 |
| 5,797,094 A | 8/1998 | Houde et al. | 455/412 |
| 5,797,096 A | 8/1998 | Lupien et al. | 455/433 |
| 5,806,000 A | 9/1998 | Vo et al. | 455/466 |
| 5,822,700 A | 10/1998 | Hult et al. | 455/466 |
| 5,930,701 A | 7/1999 | Skog | 455/415 |
| 5,946,630 A | 8/1999 | Willars et al. | 455/466 |
| 5,974,133 A * | 10/1999 | Fleischer | 379/230 |
| 5,987,323 A | 11/1999 | Huotari | 455/433 |
| 6,075,982 A * | 6/2000 | Donovan | 455/406 |
| 6,195,543 B1 * | 2/2001 | Granberg | 455/407 |

* cited by examiner

Primary Examiner—Nick Corsaro
(74) Attorney, Agent, or Firm—William H. Bollman

(57) ABSTRACT

Architecture and a method for a cost-effective implementation of new services using existing triggers, network elements, and messaging protocols in a telecommunications network. An industry wide uniformity is maintained among providers of the services while maximizing the utilization of the existing network, and without the need to wait for future developments of new standards or equipment. The architecture and methods utilize existing triggers to manage and control special service type calls, e.g., a prepaid call, within the network. ISDN User Part (ISUP) messaging protocol may be used for message exchange between network elements. A standard TCP/IP backbone is used for database interaction. Translation Type capabilities of the Service Transfer Point (STP) are used for intelligent call routing functions.

34 Claims, 24 Drawing Sheets

PREPAID CALL MANAGEMENT IN INTELLIGENT NETWORK

This application claim the benefit of Provisional application Ser. No. 60/185,053, filed Feb. 25, 2000.

BACKGROUND OF THE INVENTION

1. Field of the Invention

The present invention relates generally to communications networks. More particularly, the present invention relates to a method, an apparatus, and network architecture for management of calls, particularly prepaid calls in a telecommunications intelligent network.

2. Background of Related Art

In recent years, the telecommunication industry has seen an explosive growth both in the number of the types of services offered and in the number of service providers. Among those numerous services now being offered, prepaid call service may be one of the fastest growing segments in the telecommunication industry today.

As the name implies, a prepaid call service allows a customer of the service to pay in advance for the use of the provider's network resources in making a telephone call. The prepaid call service provides, among other things, an alternative option for a telephone user who might otherwise not be able to obtain the traditional postpaid telephone services because, e.g., of a bad credit rating, or of being in a geographical area where post paid service is unavailable.

The world-wide prepaid call services market is projected to grow tremendously in the next few years, fueling a frenzy among service suppliers to quickly add prepaid service to the list of services they already offer. Conventionally, however, the addition of a new service such as prepaid typically requires the addition of new network equipment geared to handle such new service.

For example, as shown FIG. 21, an originator 501 attempts to initiate a prepaid call to a destination 502. Such a prepaid call service typically requires a service platform 503 to "rate" the prepaid account of the originator 501 to determine whether the originator 501 has a sufficient balance to place the call. If sufficient balance is available, the prepaid service platform 503 connects (or bridges) the call between the originator 501 and the destination 502 via the public switch telephone network (PSTN) 504. The prepaid service platform 503 may also provide additional information to the originator 501, such as account balance information and/or options for replenishment of the same.

Unfortunately, the addition of new hardware components to an existing network to add a prepaid service, e.g., the addition of the prepaid service platform 503 shown in FIG. 21, requires not only the immediate expense of new equipment, but also the time and effort in modifying other components in the network to accommodate the incorporation of (and communicate with) the new equipment. These costs and/or time requirements may prohibit or delay some service providers from quickly entering the growing prepaid service market.

Moreover, even if a service provider is willing to invest the necessary time, money, and effort, the components necessary to implement the services may not be widely available. For instance, industry wide standards may not yet exist in pertinent areas to allow the wide spread development of necessary equipment by network infrastructure suppliers. Rather than waiting for the development of a standardized industry wide approach in implementing the new services, if quick deployment of the desired service is necessary, each service provider must resort to independent development of various add-on equipment to their existing networks. These sporadic patchwork solutions by individual service providers are typically not cost-effective because the cost of development of such a service is duplicated by each service provider. This separate development deters some providers away from deploying the new service until it is already widely available. This is especially true for relatively recently introduced concepts such as telecommunication services implemented intelligent networks (IN), and more particularly wireless intelligent networks.

There is a need for an architecture and method to allow a cost-effective implementation of new services using existing triggers, network elements, and messaging protocols in a telecommunications network while at the same time maintaining industry wide uniformity among providers of the services and while maximizing the utilization of an existing network, all without the need to wait for future developments of new standards or equipments.

SUMMARY OF THE INVENTION

In accordance with the principles of the present invention, a method of, and an apparatus for managing a call between an originator and a destination in a telecommunications network is provided. The method and the apparatus, according to the principles of the present invention, comprise the steps of, and the means for, receiving a call initiation from the originator, determining a service type associated with the call, routing the call handle of the call to a service control point if the service type is a first service type, e.g., a prepaid service type, the service control point having a database of profiles of a plurality of subscribers of the telecommunications network, and exchanging at least one message between the service control point and a service switching point to establish a communication link between the originator and the destination.

In addition, in accordance with the principles of the present invention, a telecommunications intelligent network is provided. The telecommunication intelligent network comprises: a service control point having a database of profiles of the users of the telecommunication intelligent network, a service transfer point to determine a service type associated with a call, and to route call information regarding the call to the service control point if the service type based on the determined service type, and a service switching point or mobile switching center to communicate with the service control point to establish a communication link between the originator and the destination of the call.

Moreover, a service control point in a telecommunications intelligent network in accordance with the principles of the present invention comprises a database of profiles of a plurality of subscribers of the telecommunication network, and a prepaid service logic adapted to exchange at least one message with a service switching point or mobile switching center of the telecommunications intelligent network to establish a communication link for a predetermined service type call. The establishment of the communication link is based on account balance information of the plurality of subscribers stored in the database.

Furthermore, a signal transfer point in a telecommunications intelligent network in accordance with the principle of the present invention comprises means for determining whether a call initiated by a caller requires one of a prepaid call service and a postpaid call service based on Translation Type mapping capability of at least one of a Signaling Control Connection Part (SCCP) layer of Signaling System 7 (SS7) and SS7 ISDN User Part (ISUP) messaging.

BRIEF DESCRIPTION OF THE DRAWINGS

Features and advantages of the present invention will become apparent to those skilled in the art from the following description with reference to the drawings, in which.

DETAILED DESCRIPTION OF PREFERRED EMBODIMENTS

For simplicity and illustrative purposes, the principles of the present invention are described by referring mainly to voice calls over the public switched telephone network (PSTN), using the Signaling System 7 (SS7) protocol terminology. However, one of ordinary skill in the art would readily recognize that the same principles are equally applicable to and can be implemented in any network (e.g., in a wireless intelligent network for voice and/or data communication) using other suitable standards and/or other suitable protocols.

The novel call management method and apparatus according to the principles of the present invention uses existing triggers within an existing network to manage and control special service type calls, e.g., a prepaid call service. In the disclosed embodiments, ISDN User Part (ISUP) messaging protocol is used for message exchanges between network elements, a standard TCP/IP backbone is used for database interactions, and Translation Type mapping capabilities of the STP, and Signaling System 7 (SS7) ISUP protocol are used for intelligent call routing functions.

The inventive architecture and method provides cost-effective and rapid implementation of new services using existing communication triggers, network elements, and messaging protocols in a telecommunications network. Additionally, the inventive method and architecture advantageously allows the implementation of new services while maintaining an industry wide uniformity among providers of services, maximizing the utilization of existing network components, and without the need to wait for future developments of new standards or equipment.

In a preferred embodiment of the present invention, call routing and management is implemented in an intelligent network. Generally, an intelligent network, e.g., commercially available from the Lucent Technologies Inc. of Murray Hill, N.J., distributes "intelligence" over elements of the network, rather than having a central administration of the network.

Figure 23:
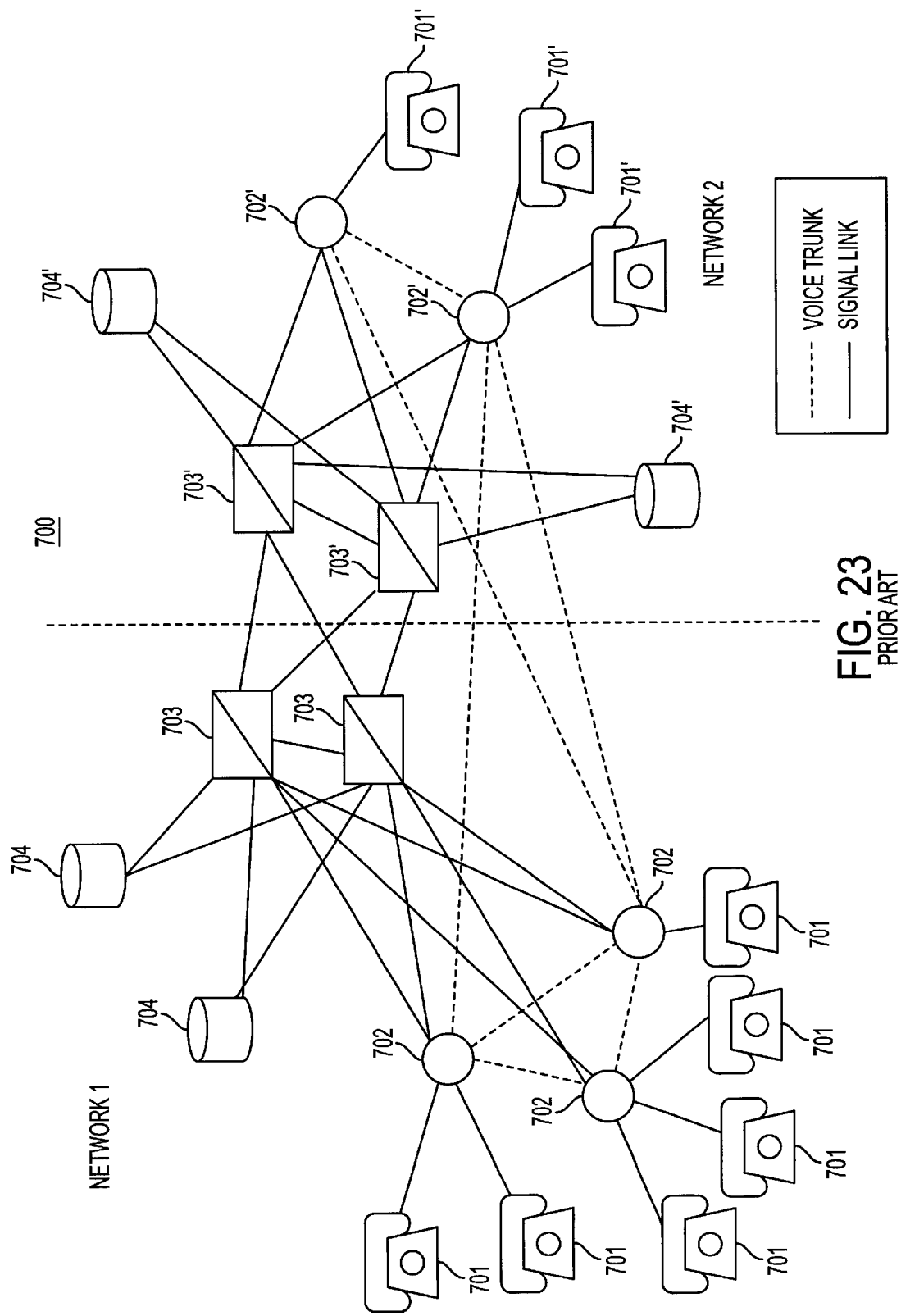
FIG. 23 shows an exemplary network architecture of a conventional intelligent network.

FIG. 23 shows an exemplary network architecture of a conventional intelligent network.

In particular, a conventional intelligent network 700 typically includes, as shown in FIG. 23, one or more Signal Switching Points (SSP) 702, 702', to which one or more of network subscribers 701, 701' are connected. The SSPs 702, 702' are typically end-office telephone switches that originate, terminate, or switch calls, and is the connection point to the world outside the network 700.

The conventional intelligent network shown in FIG. 23 typically also includes one or more Signal Transfer Points (STP) 703, 703', which are the packet switches and routing engines of the Signaling System number 7 (SS7) network, e.g., the Public Switched Telephone Network (PSTN). Although each of the STPs 703, 703' shown in FIG. 23 are shown as a single STP for simplicity, it is preferred that they be deployed as a pair for redundancy. The Signal Control Points (SCP) 704, 704' are the database management elements of the SS7 network, and are also preferred to be deployed in redundant pairs.

The call setup and tear-down procedures of an SS7 network typically involves signaling between the respective SSPs serving the call originating subscriber and the call destination subscriber, which may be a subscriber of a different network as shown in FIG. 23.

Figure 22:
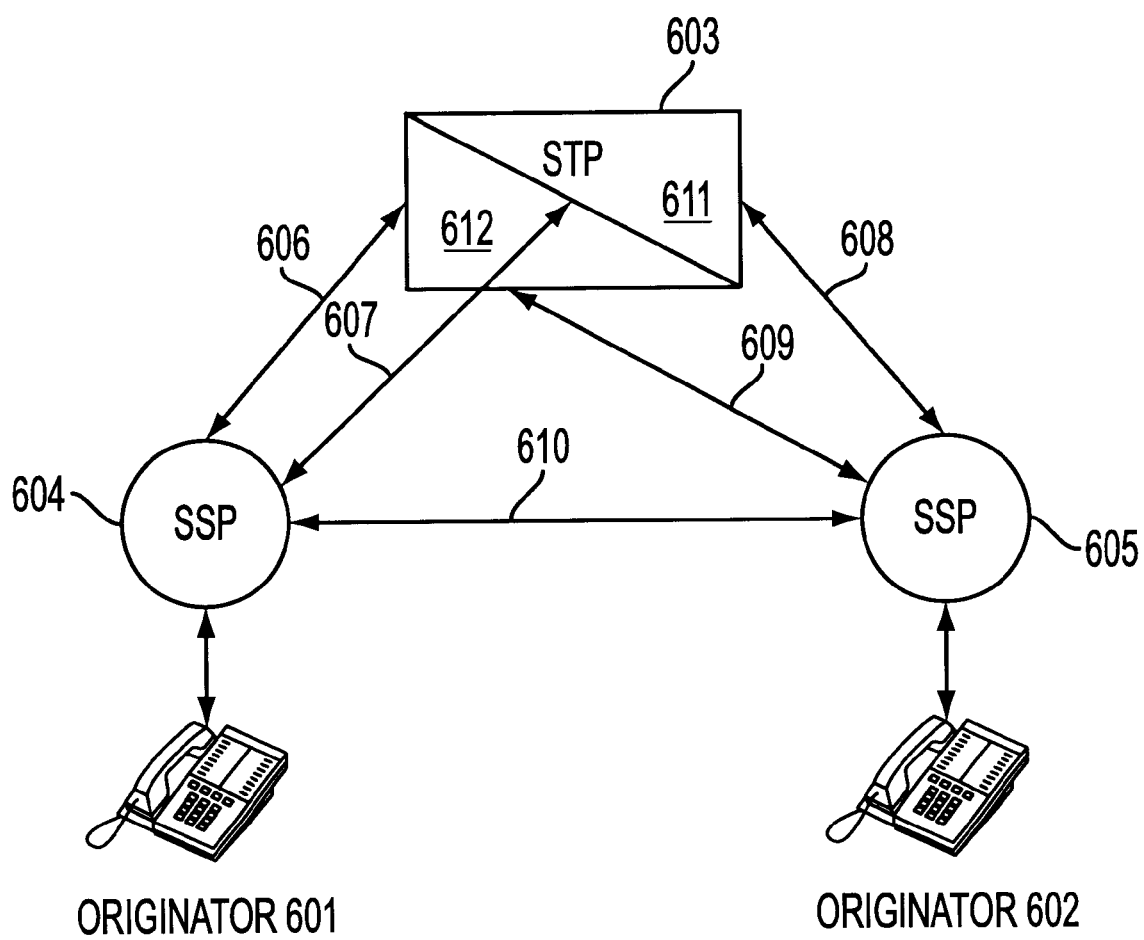
FIG. 22 shows an exemplary ISDN User Part (ISUP) message exchange between network elements during call set up and tear-down processes in a conventional postpaid telephone call using Signaling System number 7.

FIG. 22 shows an exemplary exchange of messages, e.g., using ISUP messaging.

In particular, as shown in FIG. 22, when an originator 601 dials a telephone to reach a destination 602, the originating SSP 604 transmits an Initial Address Message (IAM) to the originating side 612 of the STP pair 6Gi and 612 via signaling links 606 to reserve an idle trunk circuit from the originating SSP 604 to the destination SSP 605. The STP pair 611 and 612 shown in this example represent two physical STPs of two respective different networks, the STP 612 residing in the network from which the call originates, and the STP 611 residing in the destination network. However, the STP pair 611, 612 may instead be just one STP if, for example, both the originator 601 and the destination 602 are subscribers of the same network.

The IAM is addressed to the destination SSP 605, and includes, among other things, the originating point code (which identifies the source, i.e., the SSP 604), the destination point code (which identifies the destination, i.e., the SSP 605), and the circuit identification (which identifies the voice trunk circuit selected for reservation, i.e., the trunk 610).

The origination STP 612 examines the IAM message received from the SSP 604, and forwards the same to the appropriate destination SSP 605 via the signaling link 609.

The destination SSP 605 examines the IAM received from the STP 612, and determines whether SSP 605 serves the destination 602, and whether the destination 602 is available. If the destination 602 is available, the SSP 605 rings the destination 602, and transmits an ISUP Address Complete Message (ACM) to its home STP 611 through the signaling link 608. The STP 611 inspects the routing label of the ACM, and forwards it to the origination SSP 604 via the signaling link 607.

Upon receipt of the ACM, the origination SSP 604 connects the originator 601 to the reserved trunk 610 to allow the originator 601 to hear the ring sent by the destination SSP 605 over the reserved trunk 610. When the destination 602 picks up the telephone handset, the destination SSP 605 sends an ISUP Answer Message (ANM) to its home STP 611 via the signal link 608. The STP 611 inspects the routing label of the ANM, and forwards it to the origination SSP 604 via the signaling link 607.

Upon receipt of the ANM, the origination SSP 604 verifies the connection of the originator 601 to the reserved trunk 610, and initiates a two-way voice communication between the originator 601 and the destination 602 over the reserved trunk 610. The call set up process is now complete.

The process of tearing-down the call is started when either the originator 601 or the destination 602 hangs up. For instance, if the originator 601 initiates call tear down, upon detection of the completion of the call, the origination SSP 604 generates and sends a ISUP Release Message (REL) to the STP 612 via the signal link 606. The STP 612 forwards the REL to the destination SSP 605.

Upon receipt of the REL, the destination SSP 605 disconnects the destination 602 from the trunk 610, releases the trunk 610, and sends an ISUP Release Complete Message (RLC) to the origination SSP 604 through its home STP 611 via the signal links 608 and 607.

Upon receipt of the RLC, the origination SSP 604 idles the reserved trunk 610, completely terminating the call. The call tear-down process is now complete.

The call management method and apparatus according to the principles of the present invention uses the above existing triggers and messaging within the otherwise existing network to manage and control special service type calls, e.g., a prepaid call. The service type of a call is determined by different network elements depending upon whether the service is triggered by that customer as an originating or terminating prepaid subscriber. If originating, the SCP determines the service type. If terminating, the STP makes that determination.

Figure 1:
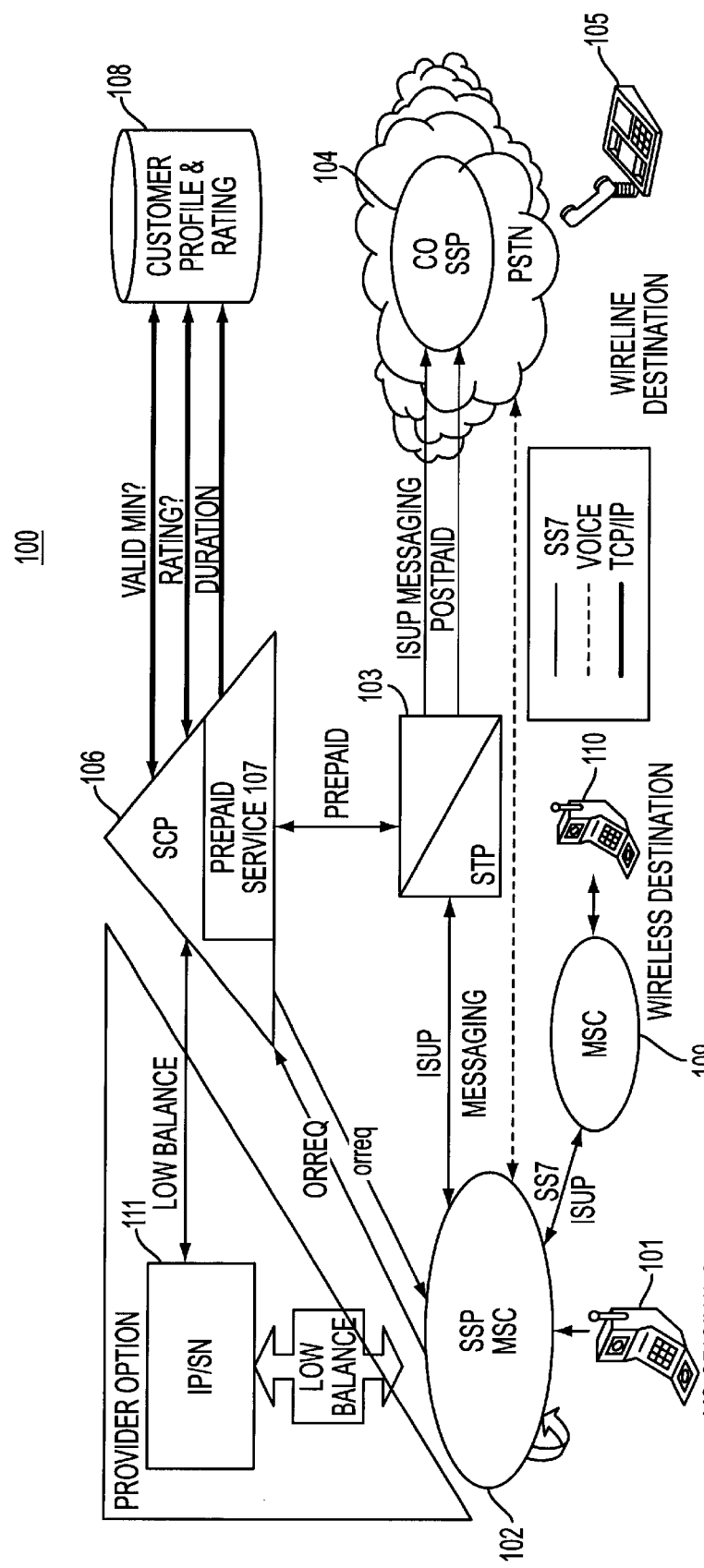
FIG. 1 shows an example of a preferred embodiment of network architecture for management of calls including prepaid calls originated in an intelligent network, in accordance with the principles of the present invention.

FIG. 1 shows an illustrative example of a preferred embodiment of the network architecture for the management of calls in accordance with the principles of the present invention.

In particular, FIG. 1 shows a wireless intelligent network including a plurality of subscribers 101, 110 of the network, one or more SSP 102, a SCP 106, and a STP 103. The exemplary network may optionally include Intelligent Peripheral (IP) and/or Service Node (SN) 111, which for example apprises a prepaid account owner of a depleting balance alert.

A SCP 106 includes access to a user profile database 108. The SCP 106 and STP 103 together manage call handling processes for postpaid call services between, e.g., a mobile in-network subscriber 101 and an outside-network destination 105 over the PTSN, e.g., using ISUP messaging.

With termination, the STP 103 only and not the SCP 106 manages a postpaid call.

In this preferred embodiment, the SCP 106 further includes prepaid service logic 107 to manage special service types, e.g., a prepaid call service. While shown in FIG. 1 implemented in the SCP 106, the prepaid service logic 107 may be implemented in another element of the network 100, with the understanding that the prepaid service logic 107 is generally preferred to not be implemented in an SSP or MSC. For example, the prepaid service logic 107 might be implemented in an STP, depending on the service. Alternatively, the prepaid service logic 107 might also be implemented on an IP/SN, but preferably only if the network element is constructed as an SN but not as an IP (because conventional IPs do not typically include data base access).

In accordance with the principles of the present invention, the STP 103 uses Translation Type mapping capabilities to intelligently route a call handle based on the service type needed. For instance, in an "active monitoring" mode or implementation, the prepaid service logic 107 within the SCP 106 takes over management of the call if the service type is determined to be one of the provided special service types, e.g., a prepaid call service. In a "passive monitoring" mode or implementation, the SCP 106 would simply monitor and preferably not actively intercede in a call.

The prepaid service logic 107 of the SCP 106 uses otherwise existing triggers and ISUP messaging protocol to communicate with other network elements, e.g., the STP 103 and the SSPs 102 (shown in this wireless network example as a Mobile Switching Center (MSC)) and 104 to handle the special service type call. The SCP 106 preferably uses a TCP/IP backbone to interact with the profile database 108.

The STP 103 will send copies of ISUP messages to the prepaid service logic 107. ISUP Messaging is preferably not routed to the SCP 106 or prepaid service logic 107.

Figure 2:
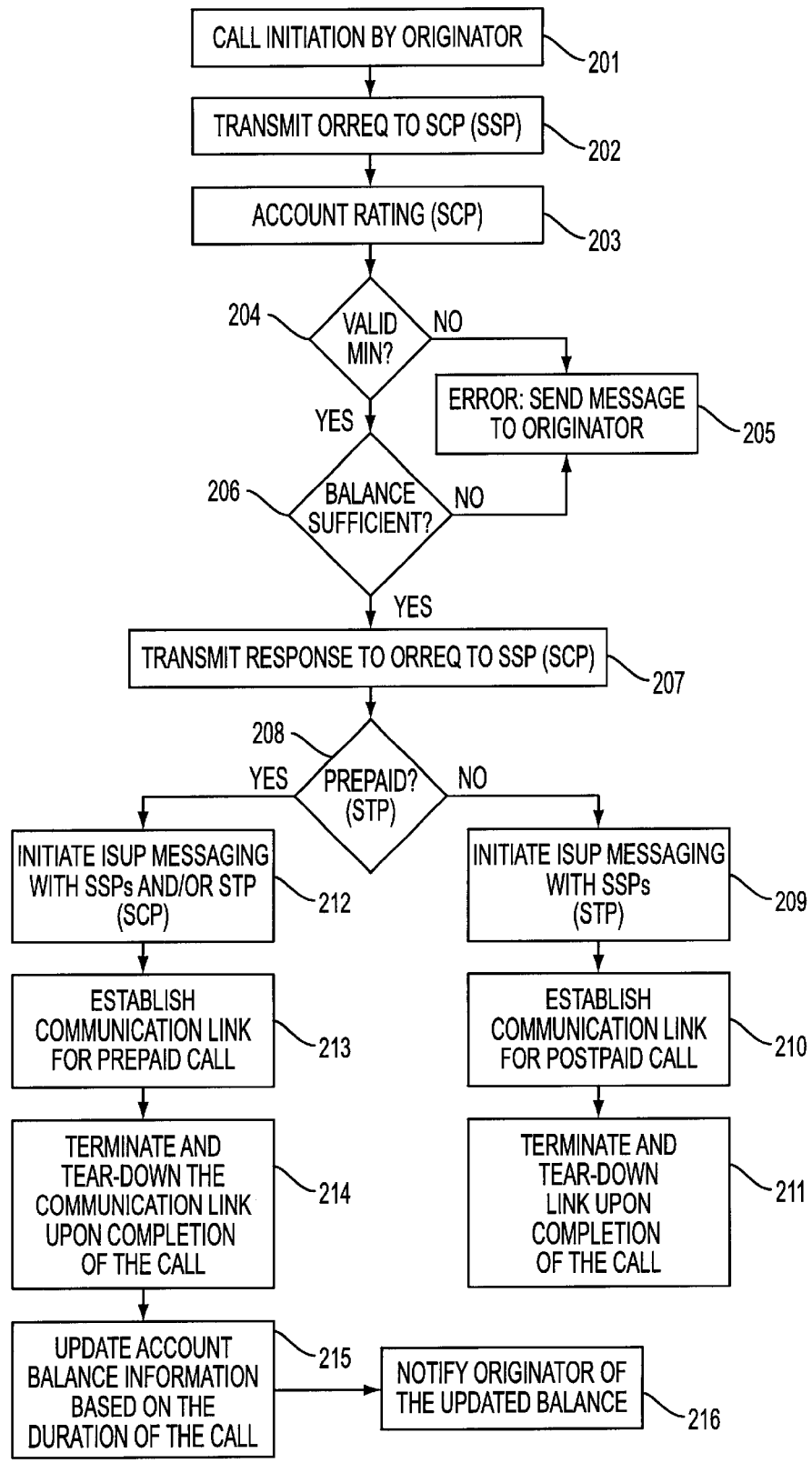
FIG. 2 shows a flow chart of an example of a preferred embodiment of call management of calls in the network architecture shown in FIG. 1.

FIG. 2 shows a flow chart of an illustrative example of a preferred embodiment of the call management of process of calls in the network architecture shown in FIG. 1 in a wireless terminated call implementation.

In particular, in step 201, the originator 101 initiates a call by, e.g., dialing the telephone number of the destination 105. The SSP 102 serving the originator 101 detects the call initiation, and sends an Origination Request (ORREC) message, which requests instructions on how to handle the call, to the SCP 106. In steps 203–206, the SCP 106 examines the subscriber information contained in the ORREC, and uses the same to "rate" the originator's account information, e.g., determining the validity and available balance of the account. If the account is invalid or if it lacks a sufficient balance to make the call, an error message is forwarded to the originator 101 in step 205.

On the other hand, if the account of the originator 101 is determined to be valid with a sufficient balance, the SCP 106 transmits an acknowledgement (orrec), indicating to route the call to an appropriate STP 103. The SSP 102 initiates the ISUP messaging for call set-up process as already explained above.

In step 208, upon the receipt of the IAM from the SSP 102, the STP 103 determines whether the call requires a prepaid call service or a postpaid call service. The determination is preferably made using the Translation Type mapping capability of the Signaling Control Connection Part (SCCP) layer of Signaling System 7 (SS7). Thus, the SCP 106 directs the call to the appropriate trunk group, usually by providing a carrier identification. This allows signaling messages to go over unique linksets which can be monitored by the prepaid service logic 107. The ORREC message return result may be used to help specific an appropriate trunk group, e.g., using a dialing plan.

Alternatively, the prepaid service logic 107 could monitor messages and screen only those which relate to prepaid service. However, this may utilize additional computer resources and thus increase costs.

If in step 208, it is determined that the call requires a postpaid call service, the STP 103 exchanges ISUP messages, i.e., the ACM, ANM, REL and RLC, as already described above in connection with the conventional process shown in FIG. 23, with the SSPs 102 and 104 to setup and tear-down the postpaid call in steps 209–211.

If, however, the call is determined to require a prepaid call service, the call handle is routed to the inventive prepaid service logic 107 of the SCP 106, which takes over the management of the prepaid call if in an "active monitoring" mode or implementation. The STP 103 performs the exchange of the ISUP messaging with the SSPs 102 and 104 to set up and tear-down the prepaid call in steps 213 and 214, respectively.

Receipt of the ANM (answer) message starts call timing for the prepaid account. Receipt of the REL message stops call timing and initiates the actual debiting of the account.

When the ISUP message indicating call release (i.e., REL) is received by the prepaid service logic 107, the duration of the call is calculated and sent to the customer profile database for real-time updating the prepaid account balance of the originator 101 in step 215. In step 216, the prepaid service logic 107 may optionally initiate a transmission of a message indicating the updated balance information to either the originator 101 or an optional IP/SN 111, which in turn forwards the information to the originator 101.

FIG. 2 relates to a wireless originating prepaid call scenario. In an example of a wireline terminating prepaid scenario, an ORREC will not be caused. Instead, a wireline trigger (e.g., an "Off_Hook_Immediate"and/or "Off_Hook Delay" type commands) message will be sent to the SCP, with an appropriate response generated by the SCP to the SSP.

Figure 3A:
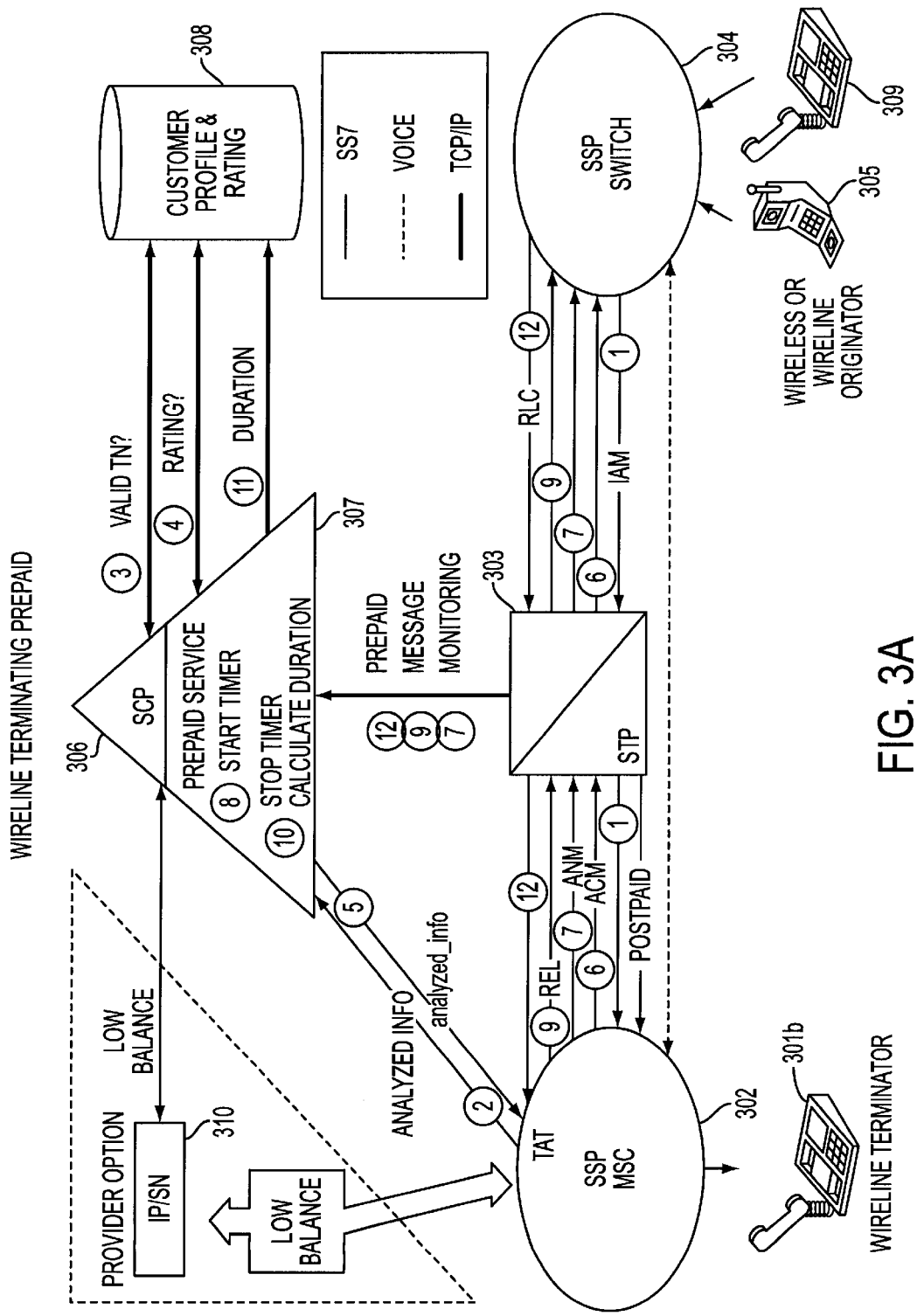
FIGS. 3A and 3B show an example of a preferred embodiment of network architecture for management of calls including prepaid calls terminated in an intelligent network in both a wireline termination (FIG. 3A) and wireless termination (FIG. 3B), in accordance with the principles of the present invention.
Figure 3B:
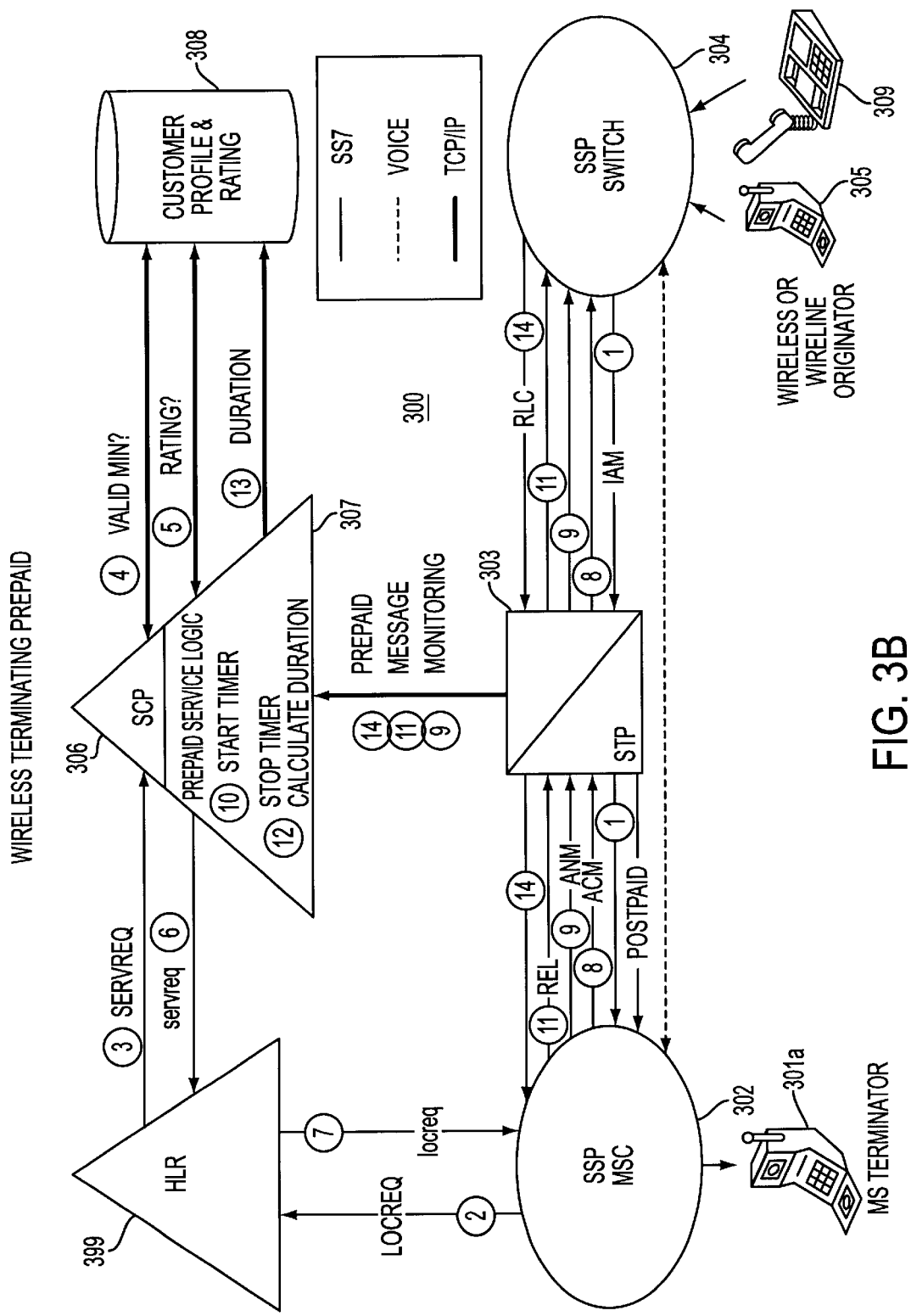

FIGS. 3A and 3B show an example of a preferred embodiment of the network architecture for the management of calls including prepaid calls terminated within an intelligent network with both a wireline destination (FIG. 3A) and a wireless destination (FIG. 3B).

In particular, with a wireline destination 301b as shown in FIG. 3A, a Termination Attempt Trigger (TAT) fires in the SSP 302, and an ANALYZED_INFO message is sent to the SCP 306. With a wireless destination 301a as shown in FIG. 3B, a LOCREQ trigger is launched to an HLR 399, which causes a SERVREQ to be sent from the HLR 399 to the SCP 306.

Otherwise, in FIGS. 3A and 3B, the elements of the network 300 including one or more subscriber 301 of the network, one or more SSP 302, a SCP 306 including a user profile database 108 and the inventive prepaid service logic 307, a STP 303, and an optional IP/SN 310 are arranged, and perform functions, similar to the corresponding network elements of the network 100 shown in FIG. 1, and as already described.

The prepaid service logic 307 manages calls of special service types, e.g., a prepaid call service, received from, e.g., an outside-network originator 305, intended for an in-network subscriber/destination 301 using the existing triggers and the ISUP messaging protocol to communicate with the other network elements.

In FIGS. 3A and 3B, only copies of relevant ISUP messages are sent to the prepaid service logic 307.

Figure 4:
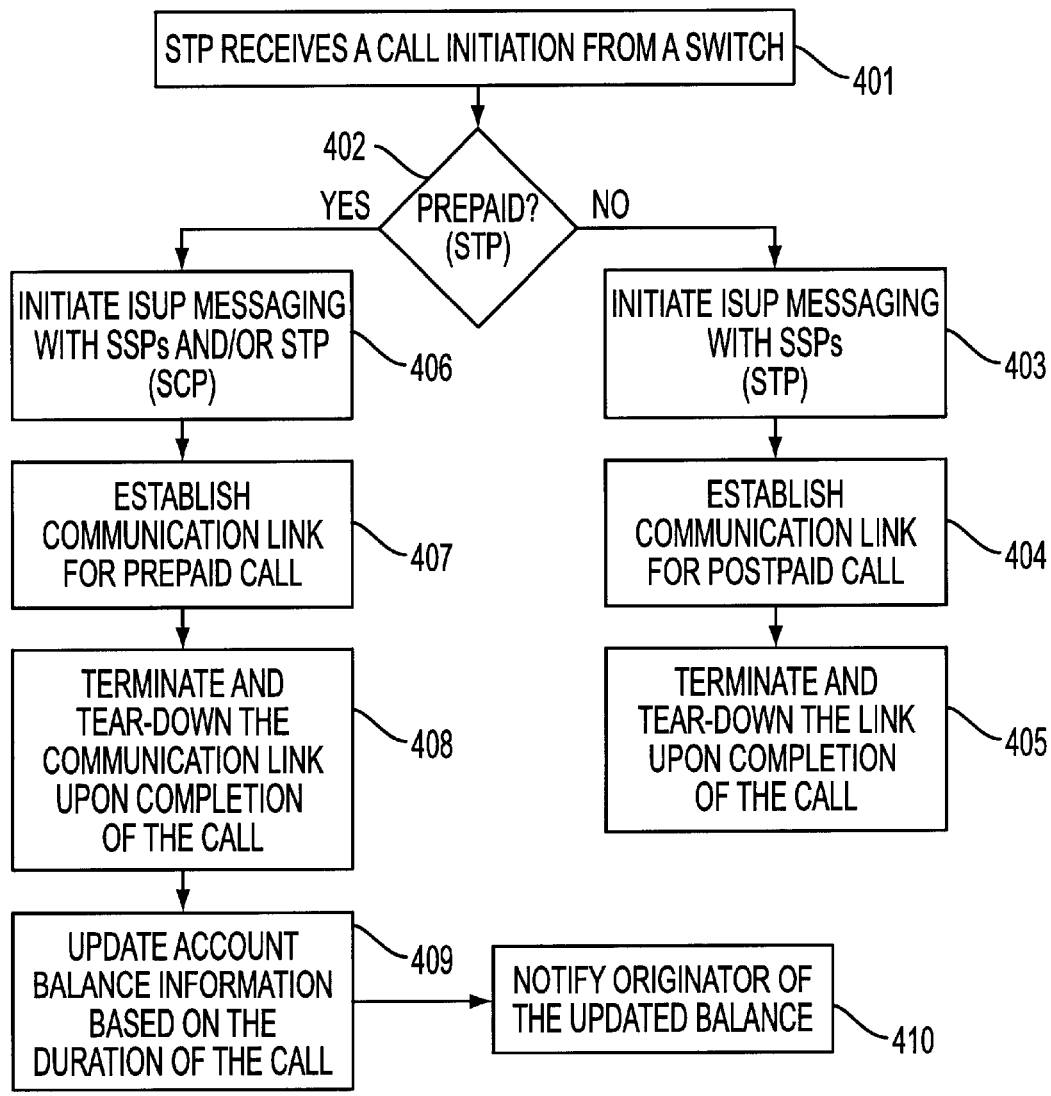
FIG. 4 shows a flow chart of an example of a preferred embodiment of call management of calls in the network architecture shown in FIGS. 3A and 3B.

FIG. 4 shows a flow chart of the management of calls received by the network shown in FIG. 3.

In particular, in step 401, a call initiated by the originator 305 is received by the STP 303.

In step 402, the STP 303 determines whether the call requires a prepaid call service or a postpaid call service, preferably using the Translation Type, mapping capability of the STP and the Signaling Control Connection Part (SCCP) layer of Signaling System 7 (SS7).

If in step 402, it is determined that the call requires a postpaid call service, the STP 303 exchanges ISUP messages, i.e., the ACM, ANM, REL and RLC, as already described above in connection with the conventional process shown in FIG. 23, with the SSPs 302 and 304 to setup and tear-down the postpaid call in steps 403–405.

If, however, the call is determined to require a prepaid call service, the call handle is routed to the inventive service logic 307 of the SCP 306, which takes over the management of the prepaid call if in an "active monitoring" mode or implementation.

The prepaid service logic 307 of the SCP 306 "rates" the subscriber/destination's account information, e.g., determining the validity and available balance of the account. If the account of the subscriber/destination 301 is determined to be valid with a sufficient balance, the STP 303 performs an exchange of ISUP messaging with the SSPs 302 and 304 to set up and tear-down the prepaid call in steps 407 and 408, respectively.

When the ISUP message indicating call release (i.e., REL) is received by the service logic 307, the duration of the call is calculated and sent to the customer profile database for real-time updating the prepaid account balance of the subscriber/destination 301 in step 409.

In step 410, the service logic 307 may optionally initiate a transmission of a message indicating the updated balance information to either the subscriber/destination 301 or an optional IP/SN 310, which in turn forwards the information to the subscriber/destination 301.

Figure 5:
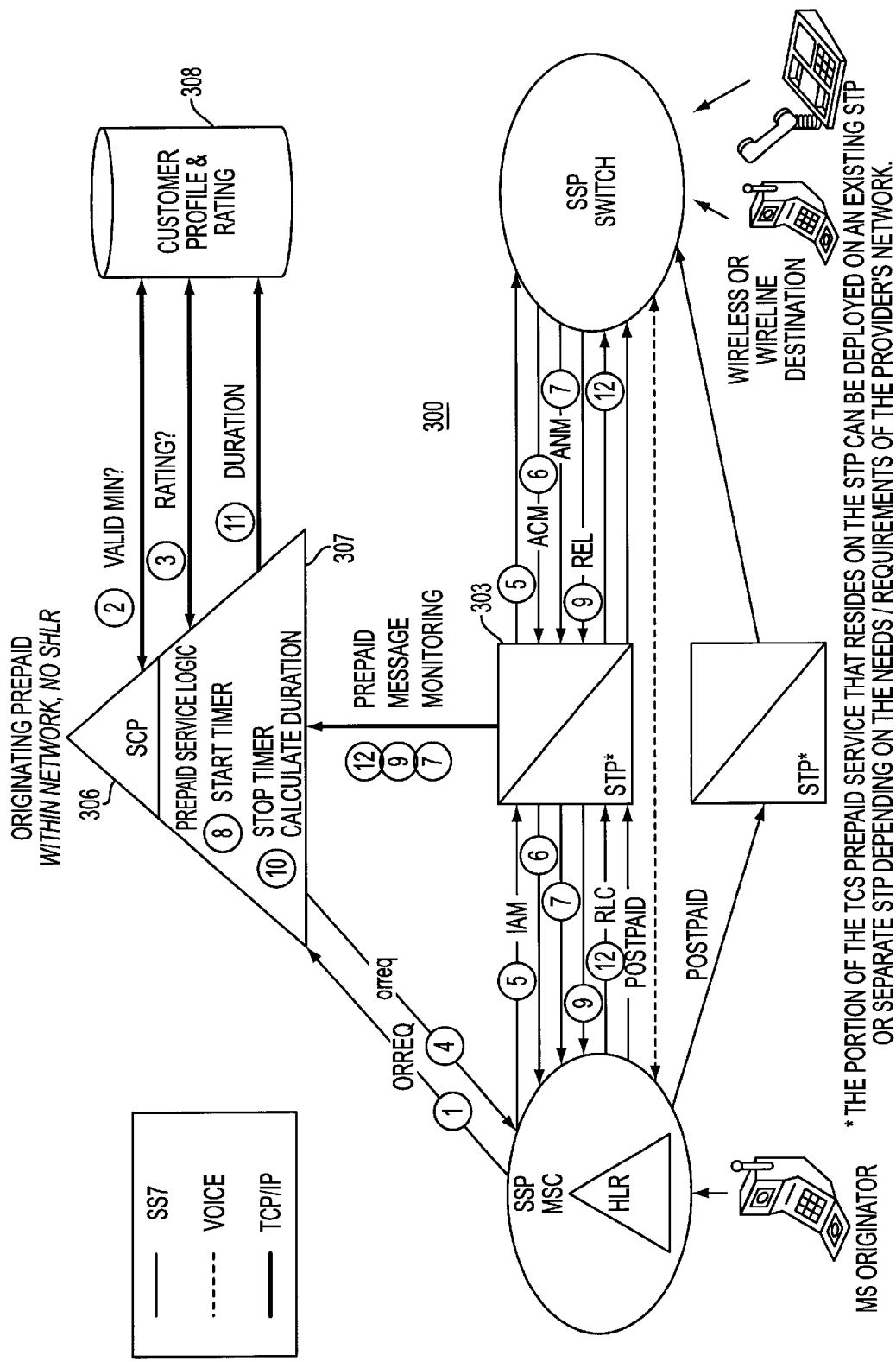
FIG. 5 shows a message sequence for a prepaid call with a wireless device originating the prepaid call within a network with no SHLR (stand-alone home location register), in accordance with the principles of the present invention.

FIG. 5 shows a message sequence for a prepaid call with a wireless device originating the prepaid call within a network with no SHLR (stand-alone home location register), in accordance with the principles of the present invention. In FIG. 5, only copies of relevant ISUP messages need be sent to the prepaid service logic 307.

Figure 6:
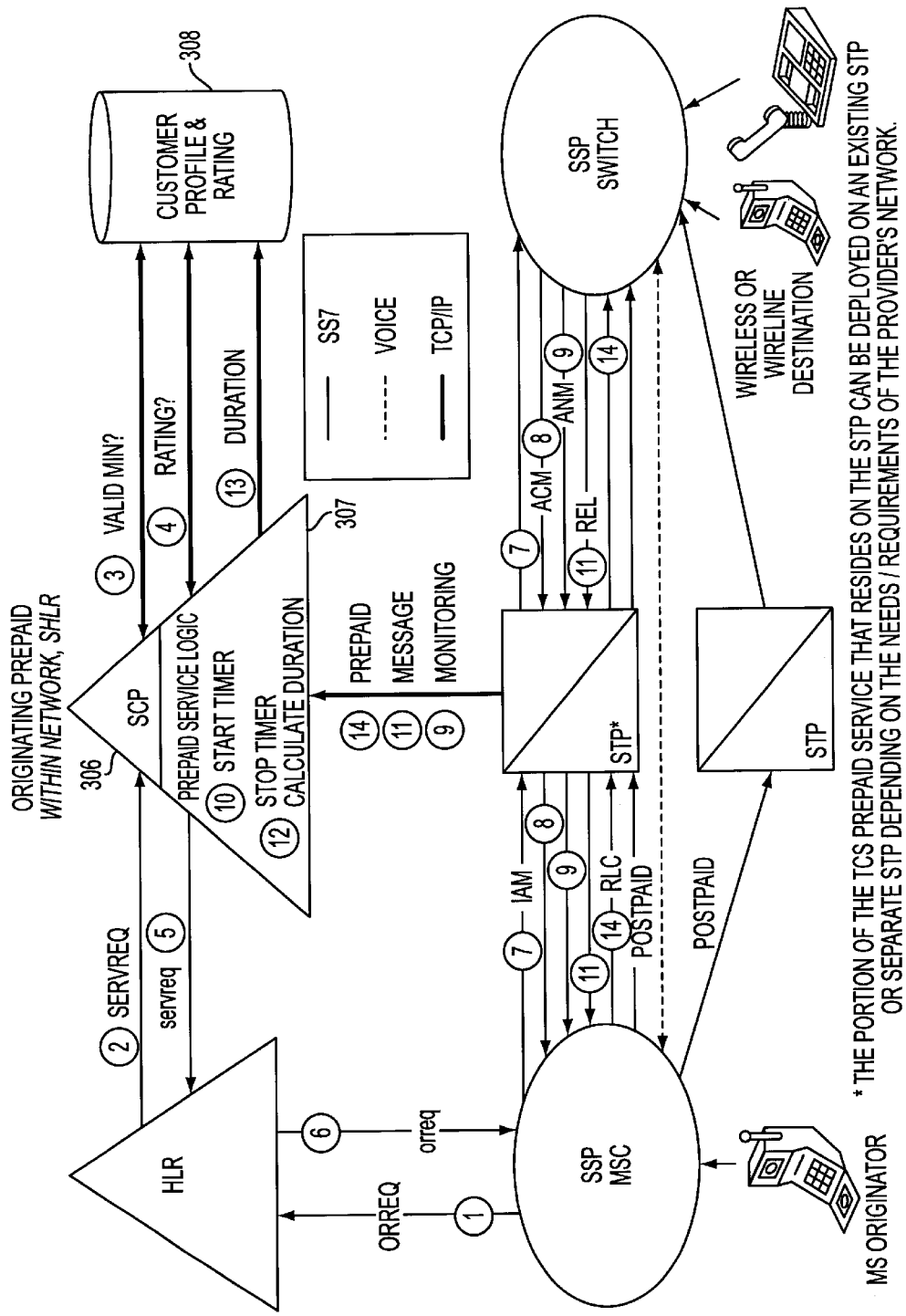
FIG. 6 shows a message sequence for a prepaid call with a wireless device originating the prepaid call within a network using an SHLR, in accordance with the principles of the present invention.

FIG. 6 shows a message sequence for a prepaid call with a wireless device originating the prepaid call within a network using an SHLR, in accordance with the principles of the present invention. In FIG. 6, only copies of relevant ISUP messages need be sent to the prepaid service logic 307.

Figure 7:
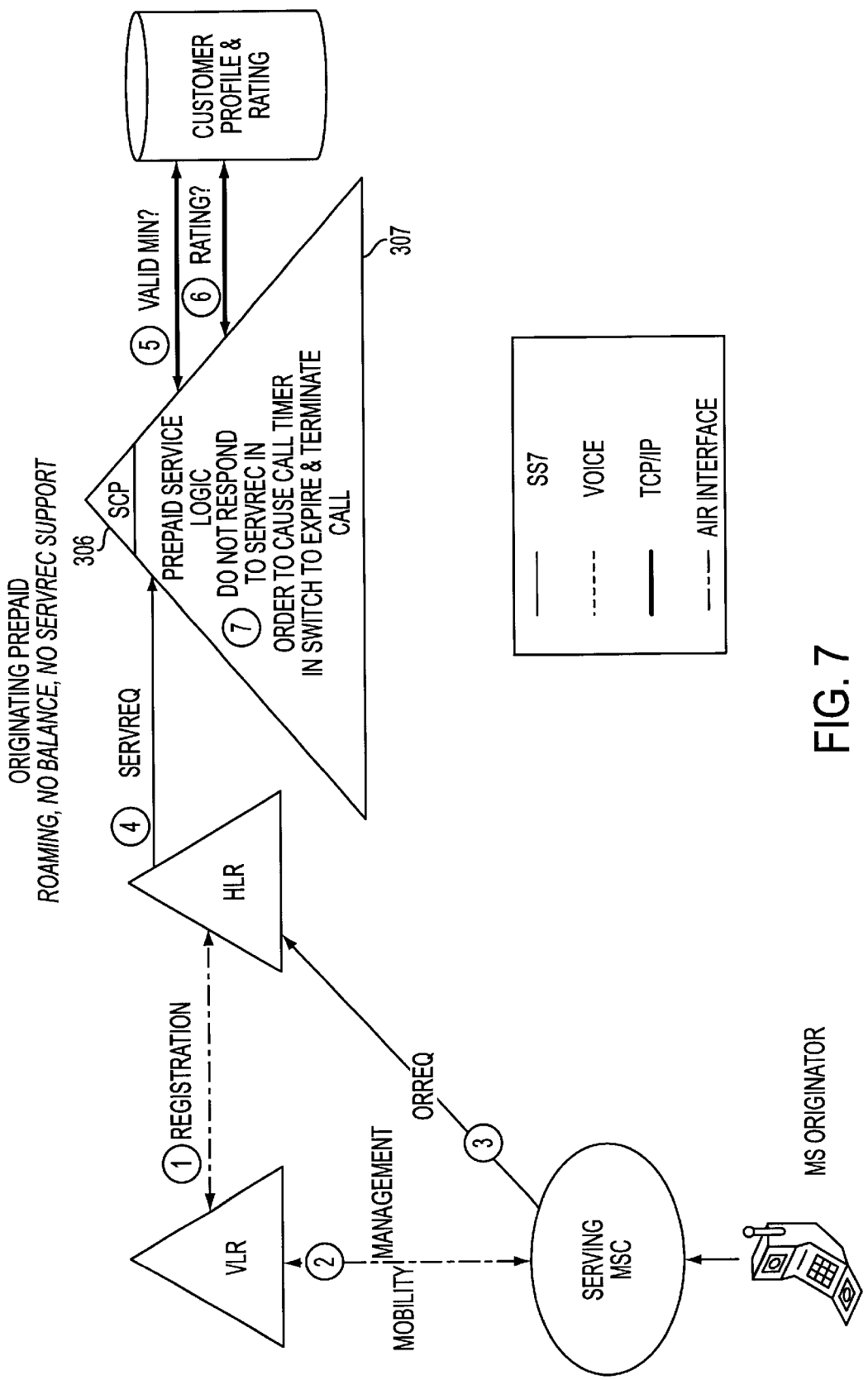
FIG. 7 shows a message sequence for a prepaid call with a wireless device originating the prepaid call through the use of roaming, no balance remaining on account for the wireless device, and no SERVREC support, in accordance with the principles of the present invention.

FIG. 7 shows a message sequence for a prepaid call with a wireless device originating the prepaid call through the use of roaming, no balance remaining on account for the wireless device, and no SERVREC support, in accordance with the principles of the present invention.

Figure 8:
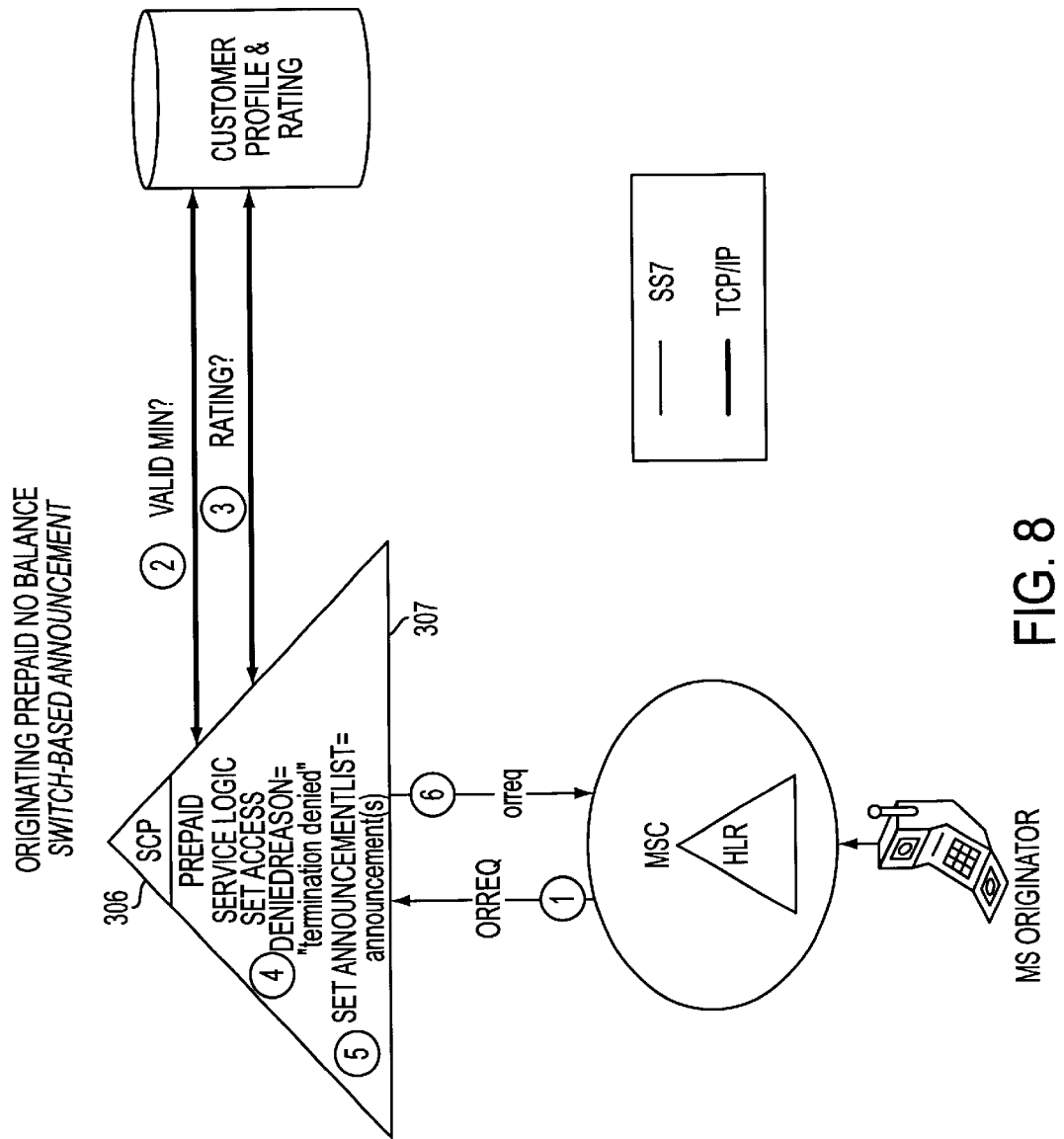
FIG. 8 shows a message sequence for a prepaid call with a wireless device originating the prepaid call which does not have a balance on account remaining, using a switch-based announcement, in accordance with the principles of the present invention.

FIG. 8 shows a message sequence for a prepaid call with a wireless device originating the prepaid call which does not have a balance on account remaining, using a switch-based announcement, in accordance with the principles of the present invention.

Figure 9:
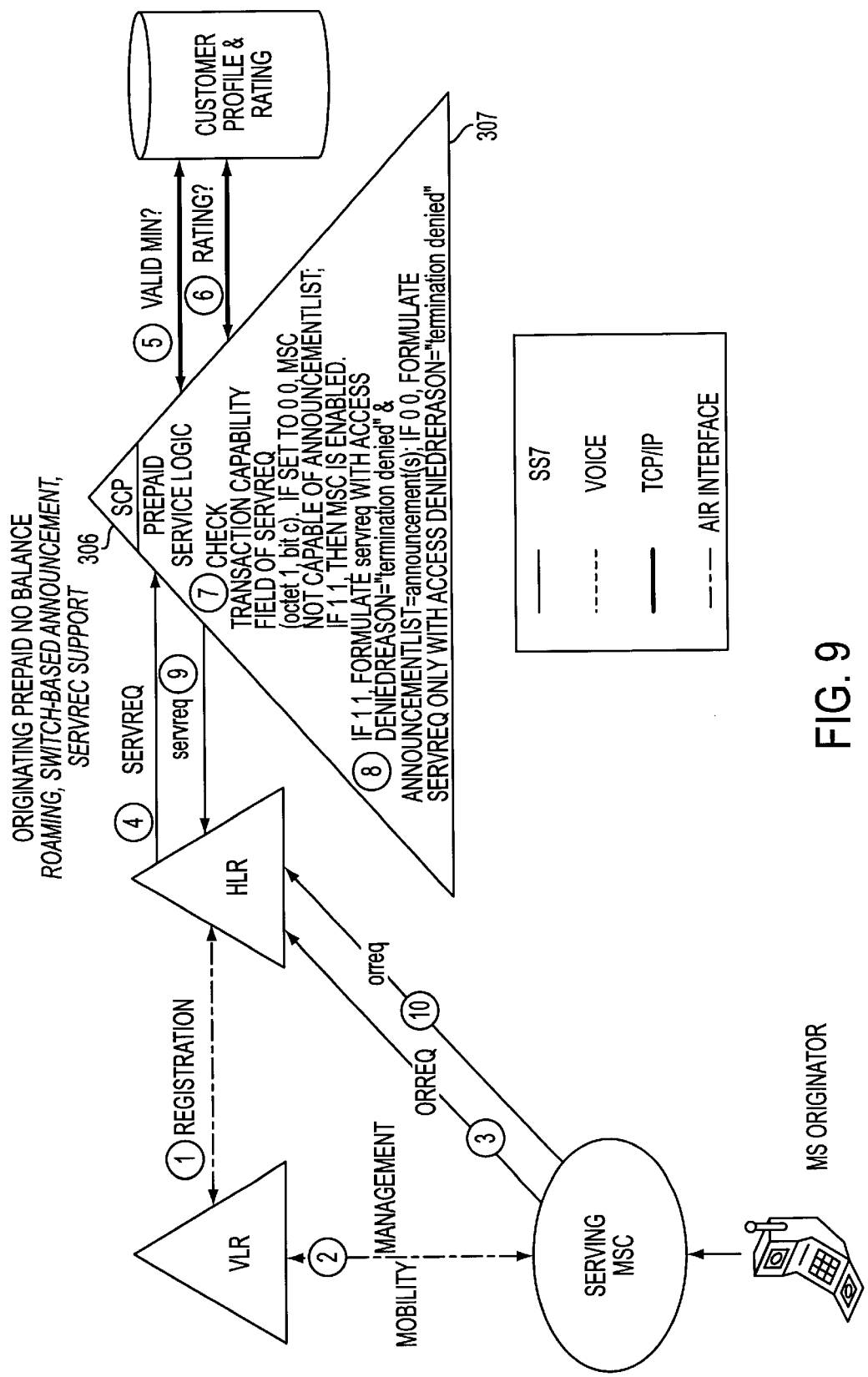
FIG. 9 shows a message sequence for a prepaid call with a wireless device originating the prepaid call, the wireless device not having any balance remaining on their prepaid account, using roaming, a switch-based announcement, and SERVREC support, in accordance with the principles of the present invention.

FIG. 9 shows a message sequence for a prepaid call with a wireless device originating the prepaid call, the wireless device not having any balance remaining on their prepaid account, using roaming, a switch-based announcement, and SERVREC support, in accordance with the principles of the present invention.

Figure 10:
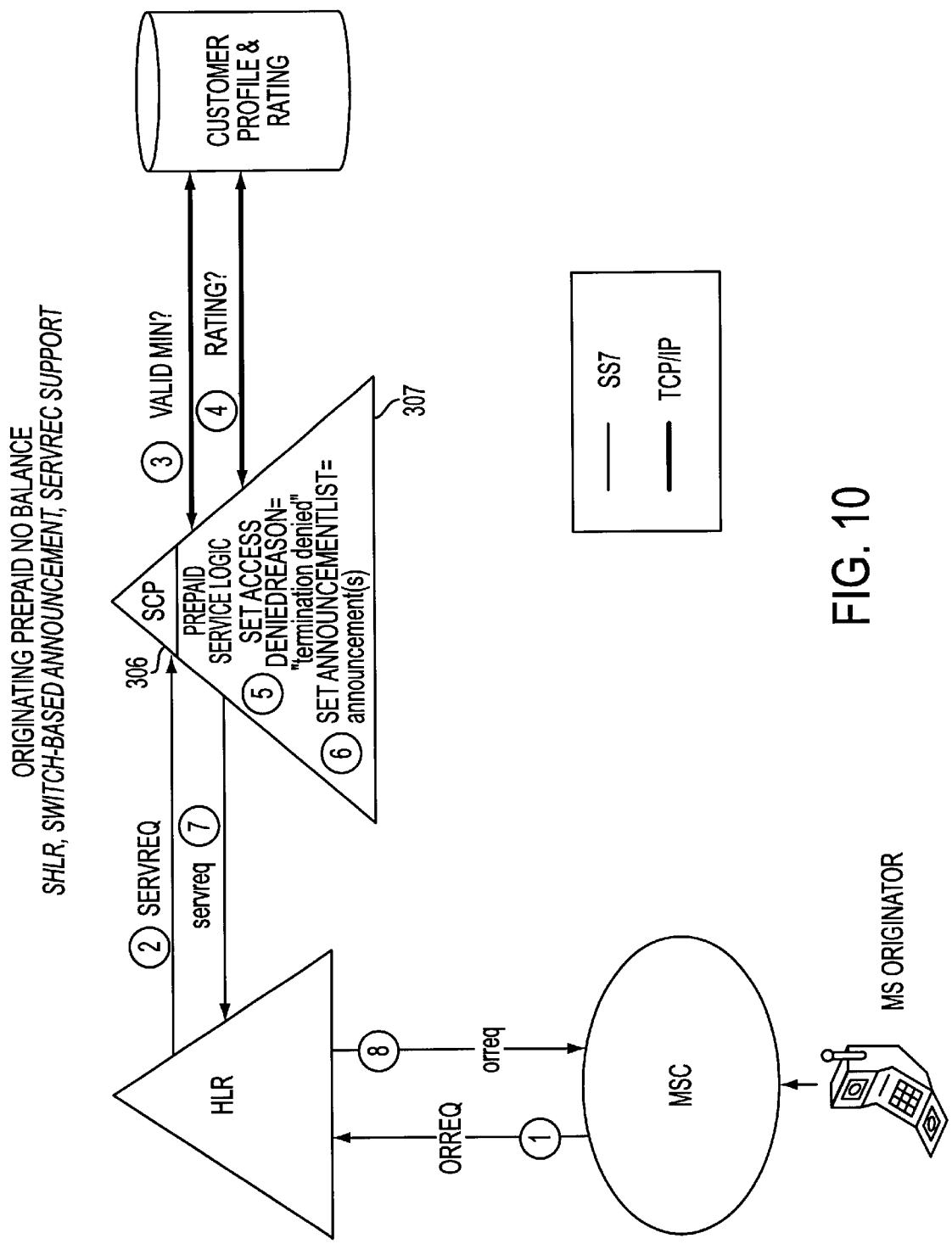
FIG. 10 shows a message sequence for a prepaid call with a wireless device originating the prepaid call, the wireless device not having any balance remaining on their prepaid account, using an SHLR, a switch-based announcement, and SERVREC support, in accordance with the principles of the present invention.

FIG. 10 shows a message sequence for a prepaid call with a wireless device originating the prepaid call, the wireless device not having any balance remaining on their prepaid account, using an SHLR, a switch-based announcement, and SERVREC support, in accordance with the principles of the present invention.

Figure 11:
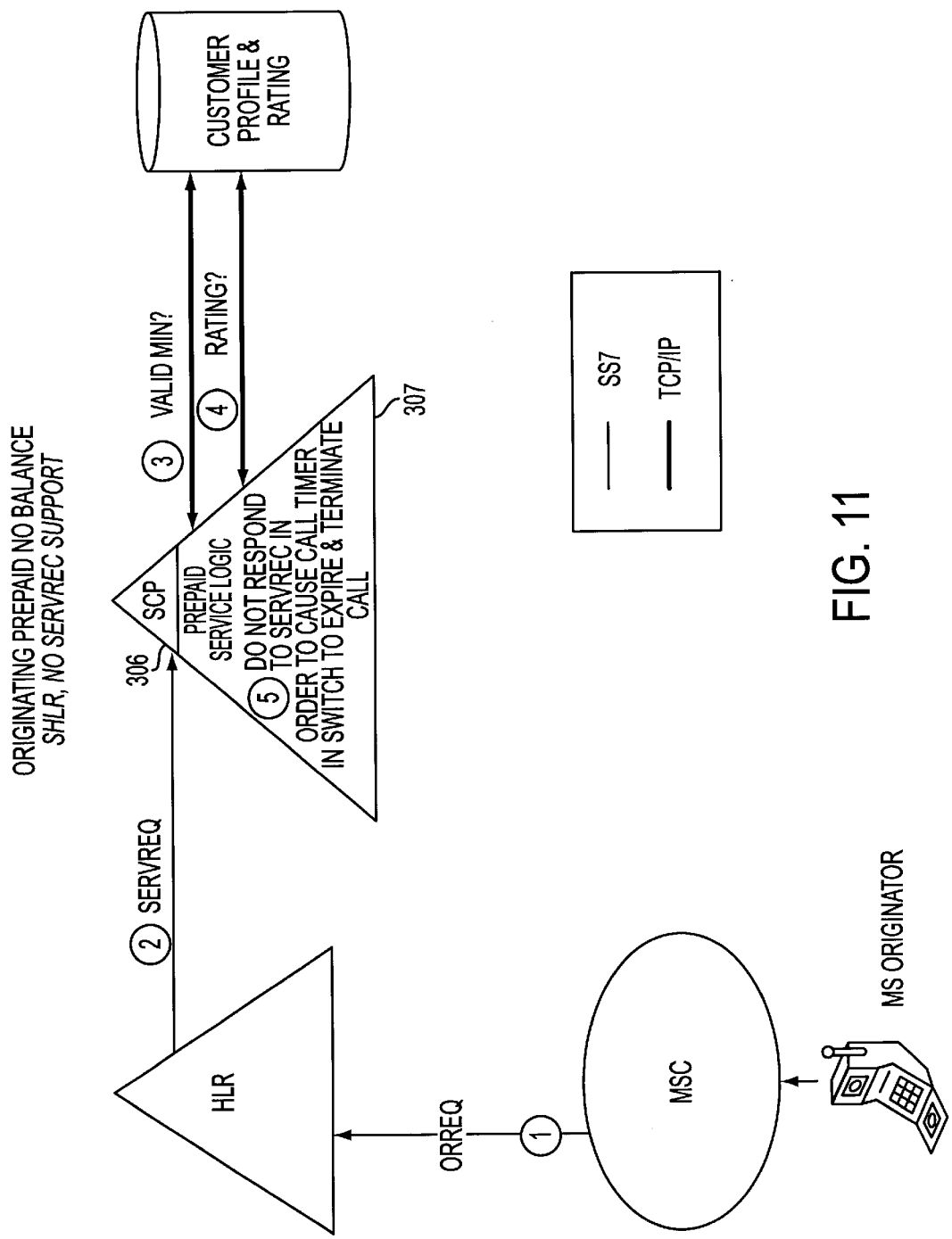
FIG. 11 shows a message sequence for a prepaid call with a wireless device originating the prepaid call, the wireless device not having any balance remaining on their prepaid account, using an SHLR, but without SERVREC support, in accordance with the principles of the present invention.

FIG. 11 shows a message sequence for a prepaid call with a wireless device originating the prepaid call, the wireless device not having any balance remaining on their prepaid account, using an SHLR, but without SERVREC support, in accordance with the principles of the present invention.

Figure 12:
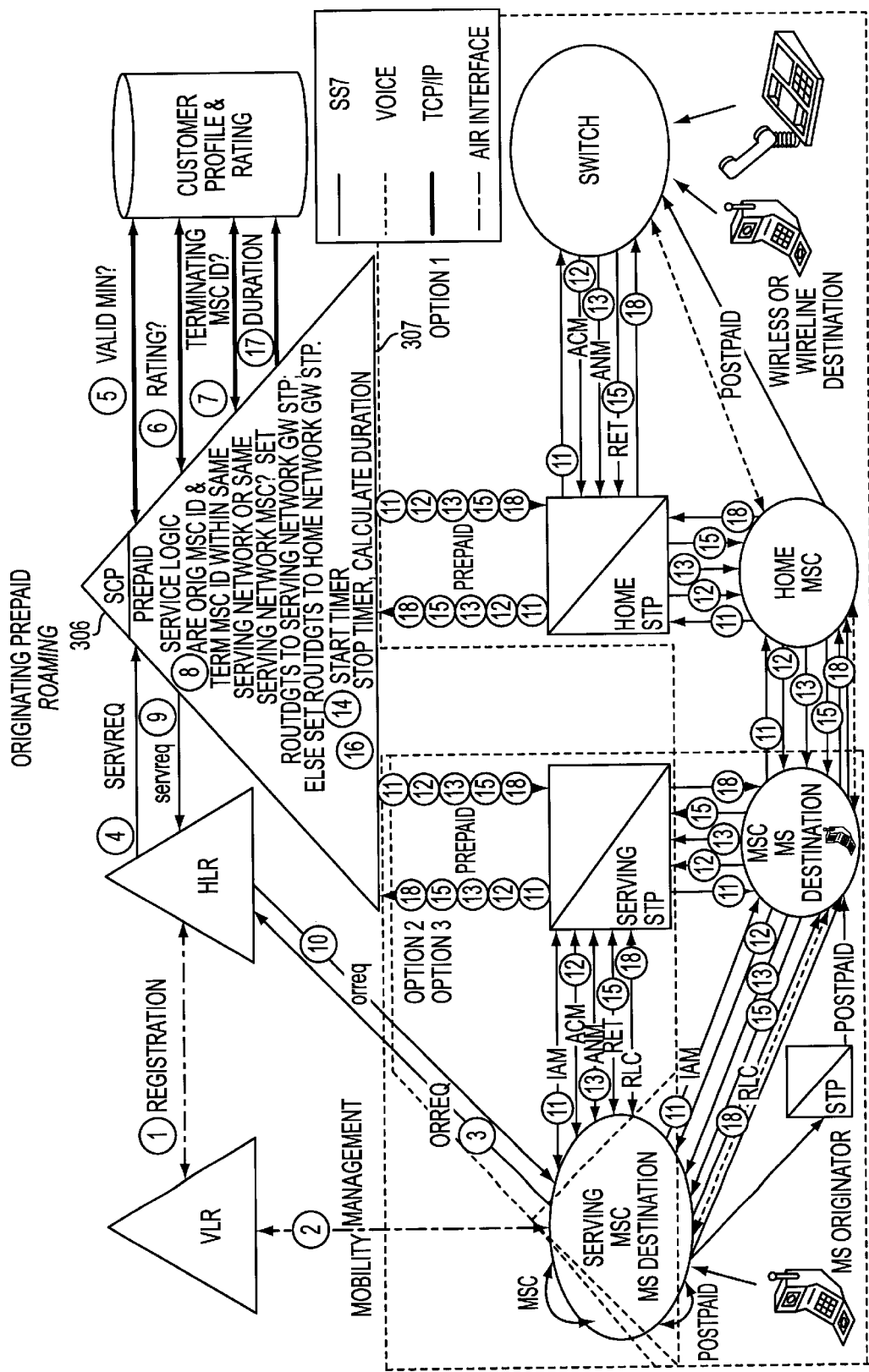
FIG. 12 shows a message sequence for a prepaid call with a wireless device originating the prepaid call using roaming services, in accordance with the principles of the present invention.

FIG. 12 shows a message sequence for a prepaid call with a wireless device originating the prepaid call using roaming services, in accordance with the principles of the present invention.

Figure 13:
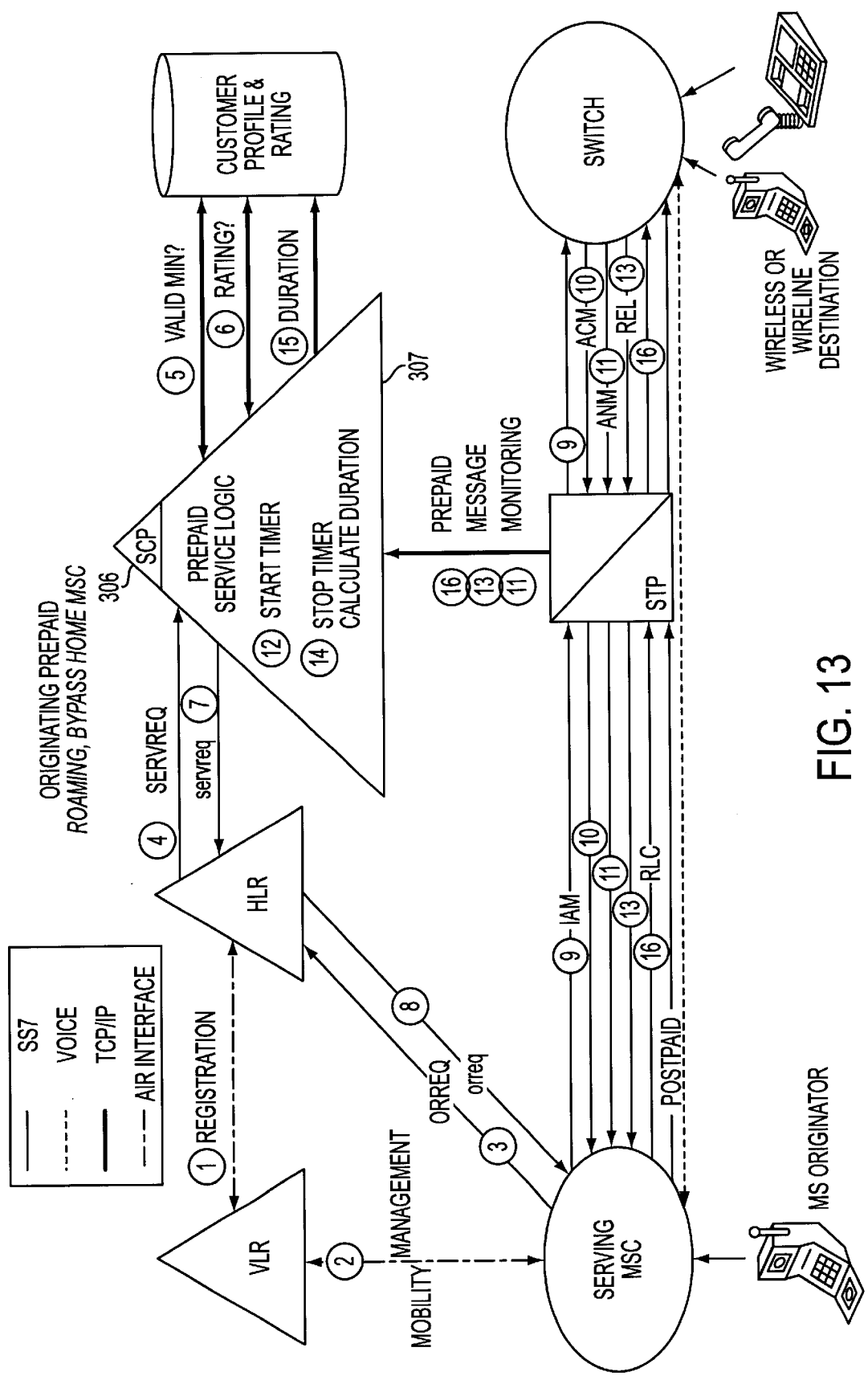
FIG. 13 shows a message sequence for a prepaid call with a wireless device originating the prepaid call using roaming services, but bypassing the home message servicing center (MSC), in accordance with the principles of the present invention.

FIG. 13 shows a message sequence for a prepaid call with a wireless device originating the prepaid call using roaming services, but bypassing the home message servicing center (MSC), in accordance with the principles of the present invention. In FIG. 13, only copies of relevant ISUP messages need be sent to the prepaid service logic 307.

Figure 14:
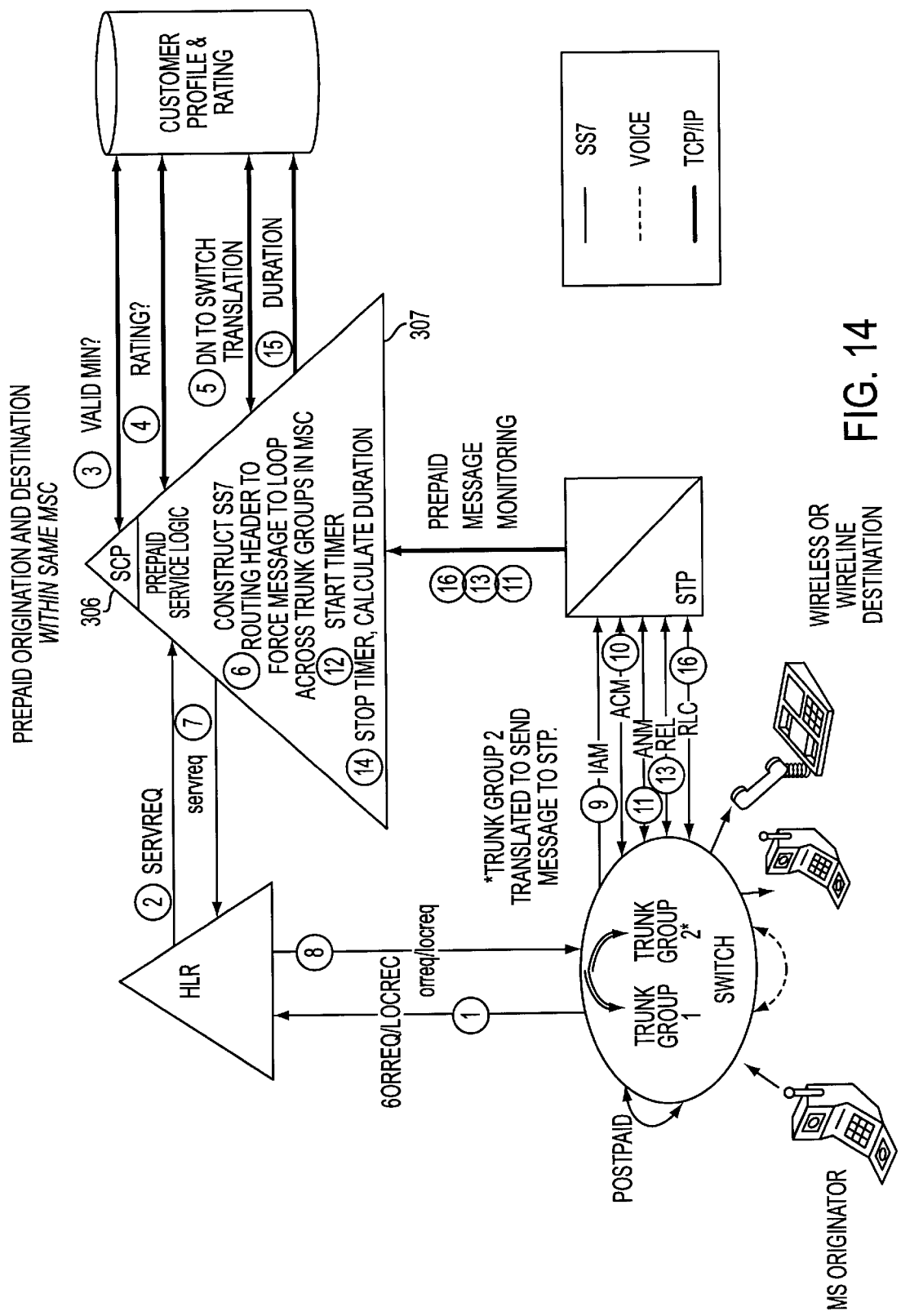
FIG. 14 shows a message sequence for a prepaid call with a wireless device originating the prepaid call, to a wireless or wireline device also having prepaid services, both devices being serviced by the same message servicing center (MSC), in accordance with the principles of the present invention.

FIG. 14 shows a message sequence for a prepaid call with a wireless device originating the prepaid call, to a wireless or wireline device also having prepaid services, both devices being serviced by the same message servicing center (MSC), in accordance with the principles of the present invention. In FIG. 14, only copies of relevant. ISUP messages need be sent to the prepaid service logic 307.

Figure 15:
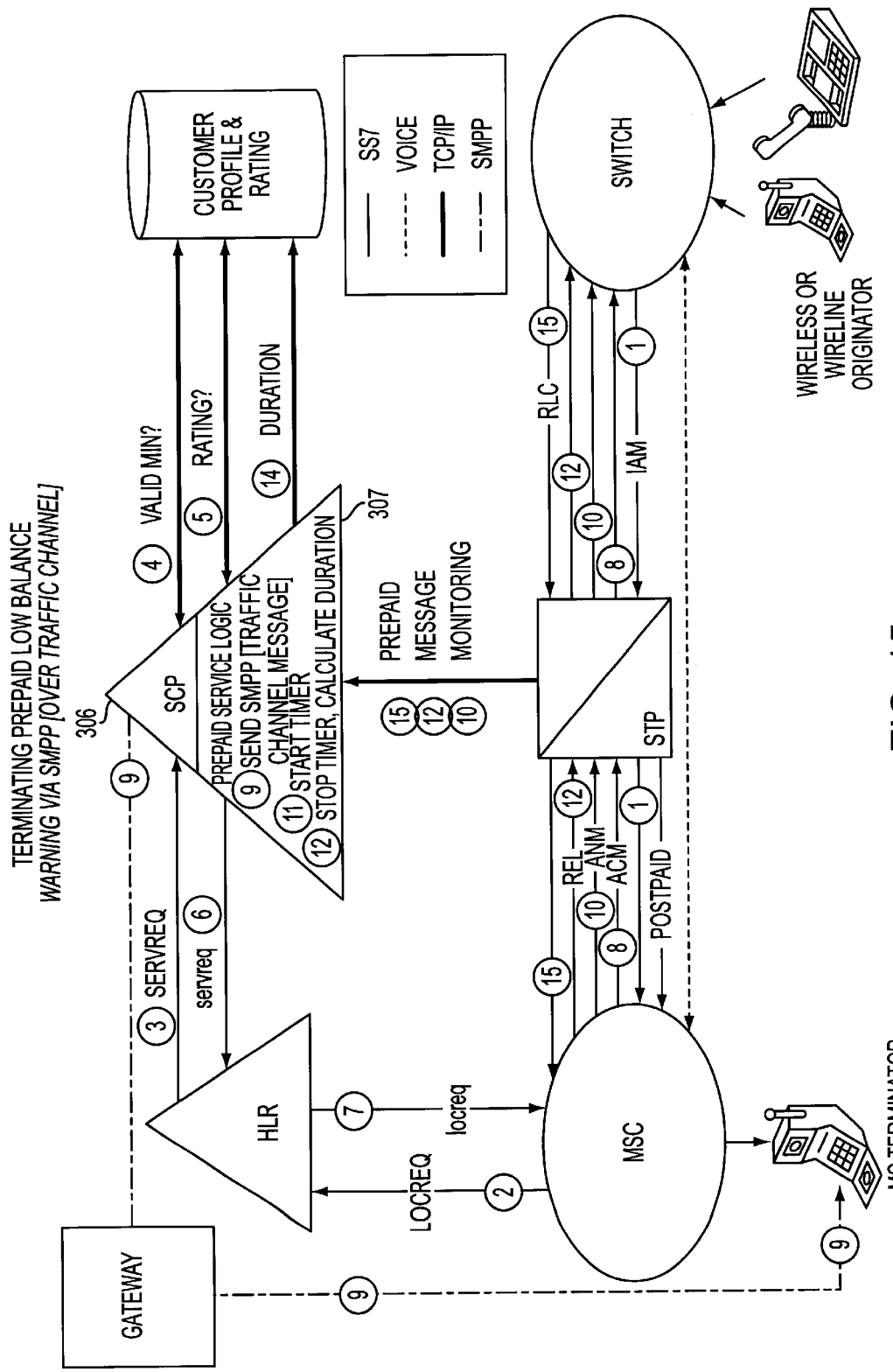
FIG. 15 shows a message sequence for a prepaid call with a wireless device terminating (i.e., receiving) the prepaid call from a wireless or wireline device, in a scenario of a low balance on account remaining, with a warning message sent to the wireless device via SMPP over a traffic channel, in accordance with the principles of the present invention.

FIG. 15 shows a message sequence for a prepaid call with a wireless device terminating (i.e., receiving) the prepaid call from a wireless or wireline device, in a scenario of a low balance on account remaining, with a warning message sent to the wireless device via SMPP over a traffic channel, in accordance with the principles of the present invention. In FIG. 15, only copies of relevant ISUP messages need be sent to the prepaid service logic 307.

Figure 16:
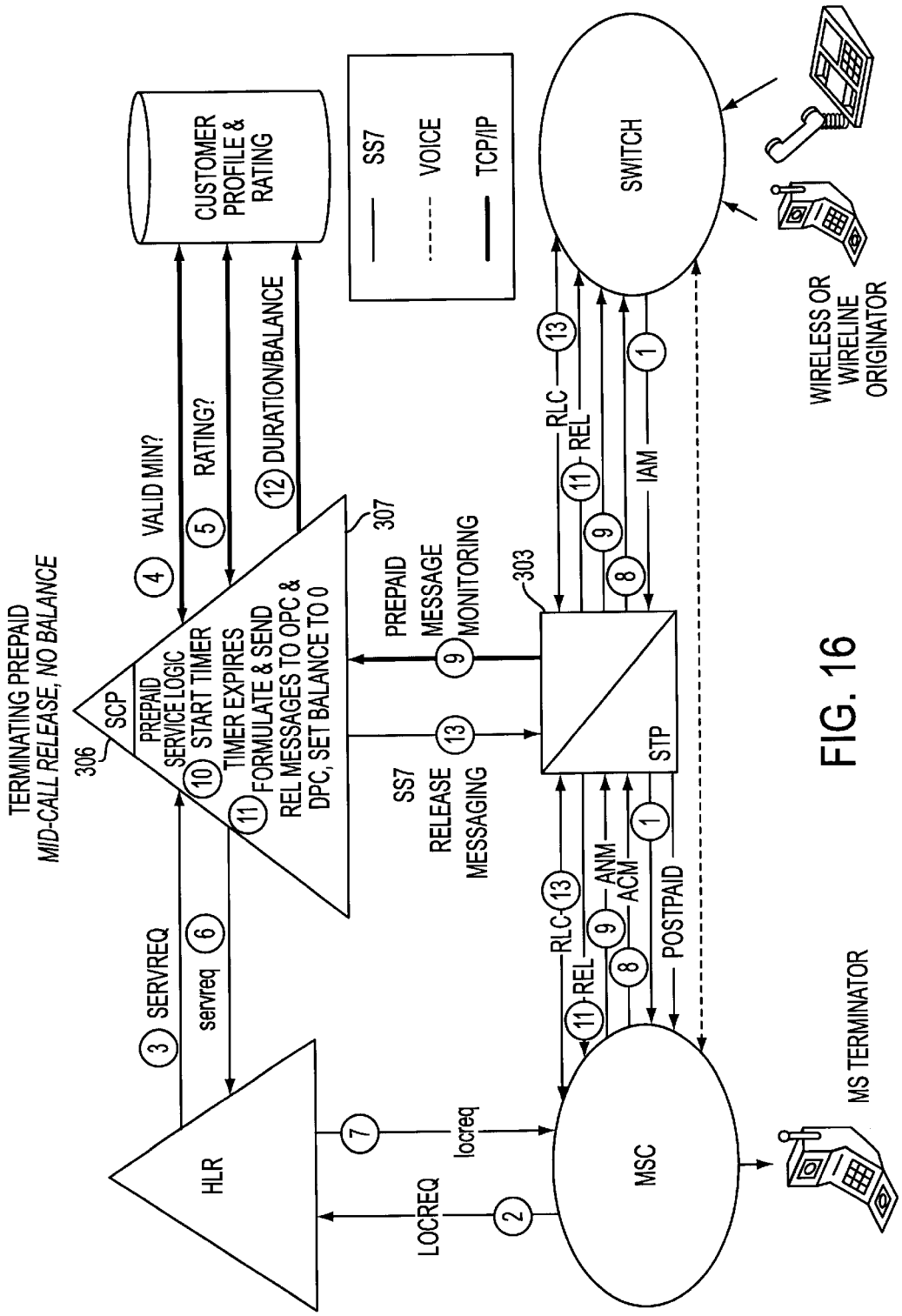
FIG. 16 shows a message sequence for a prepaid call with a wireless device terminating (i.e., receiving) the prepaid call from a wireless or wireline device, in a scenario of no balance remaining on account for the wireless device, causing a mid-call release of the call, caused by the prepaid application's active intervention into the call flow, in accordance with the principles of the present invention.

FIG. 16 shows a message sequence for a prepaid call with a wireless device terminating (i.e., receiving),the prepaid call from a wireless or wireline device, in a scenario of no balance remaining on account for the wireless device, causing a mid-call release of the call, caused by the prepaid application's active intervention into the call flow, in accordance with the principles of the present invention. In FIG. 16, only copies of relevant ISUP messages need be sent to the prepaid service logic 307, and release messages necessary to terminate call will be sent over the SS7 link.

Figure 17:
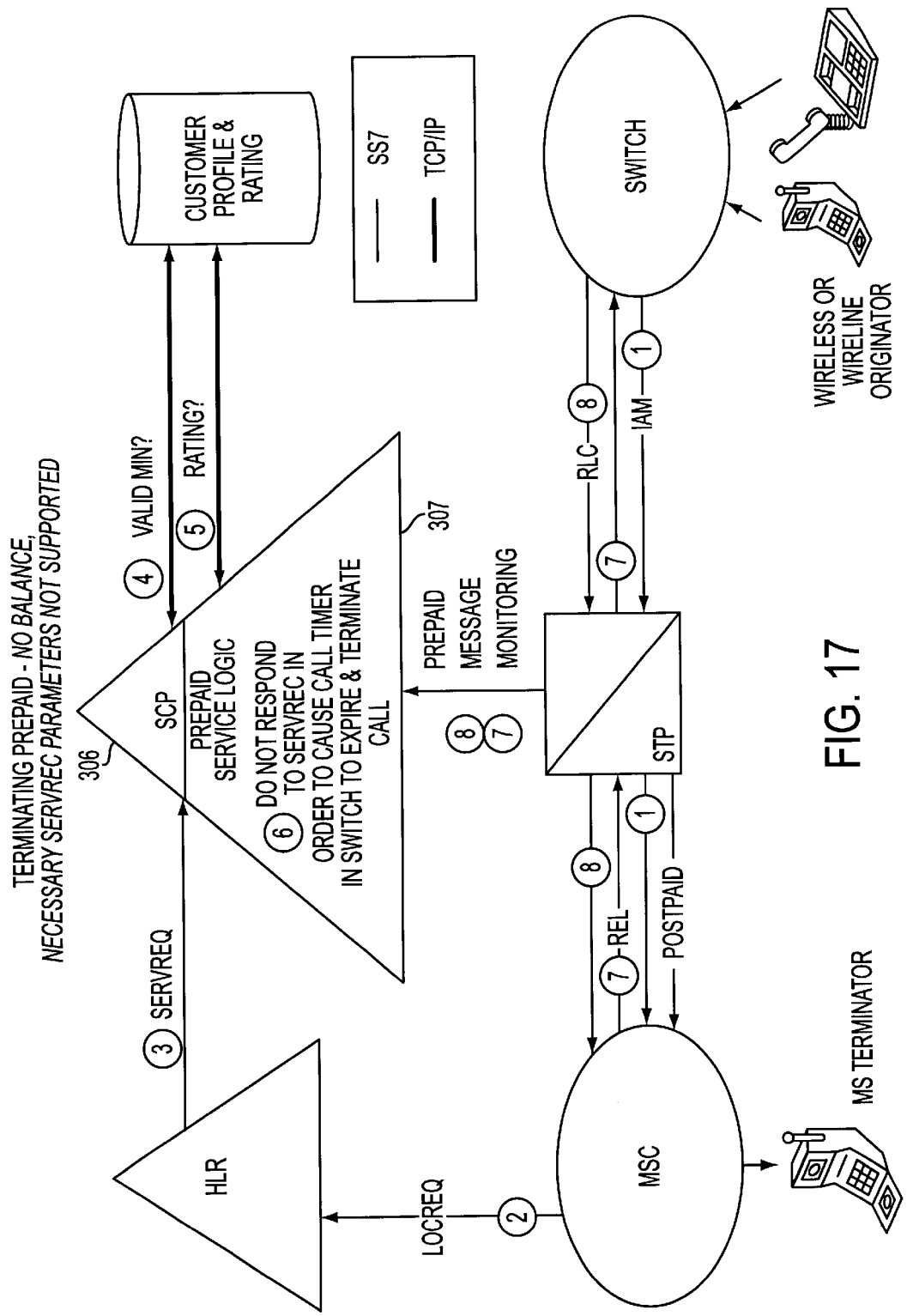
FIG. 17 shows a message sequence for a prepaid call with a wireless device terminating (i.e., receiving) the prepaid call from a wireless or wireline device, in a scenario of no balance remaining on account for the wireless device, and without support for SERVREC, in accordance with the principles of the present invention.

FIG. 17 shows a message sequence for a prepaid call with a wireless device terminating (i.e., receiving) the prepaid call from a wireless or wireline device, in a scenario of no balance remaining on account for the wireless device, and without support for SERVREC, in accordance with the principles of the present invention In FIG. 15, only copies of relevant ISUP messages need be sent to the prepaid service logic 307.

Figure 18:
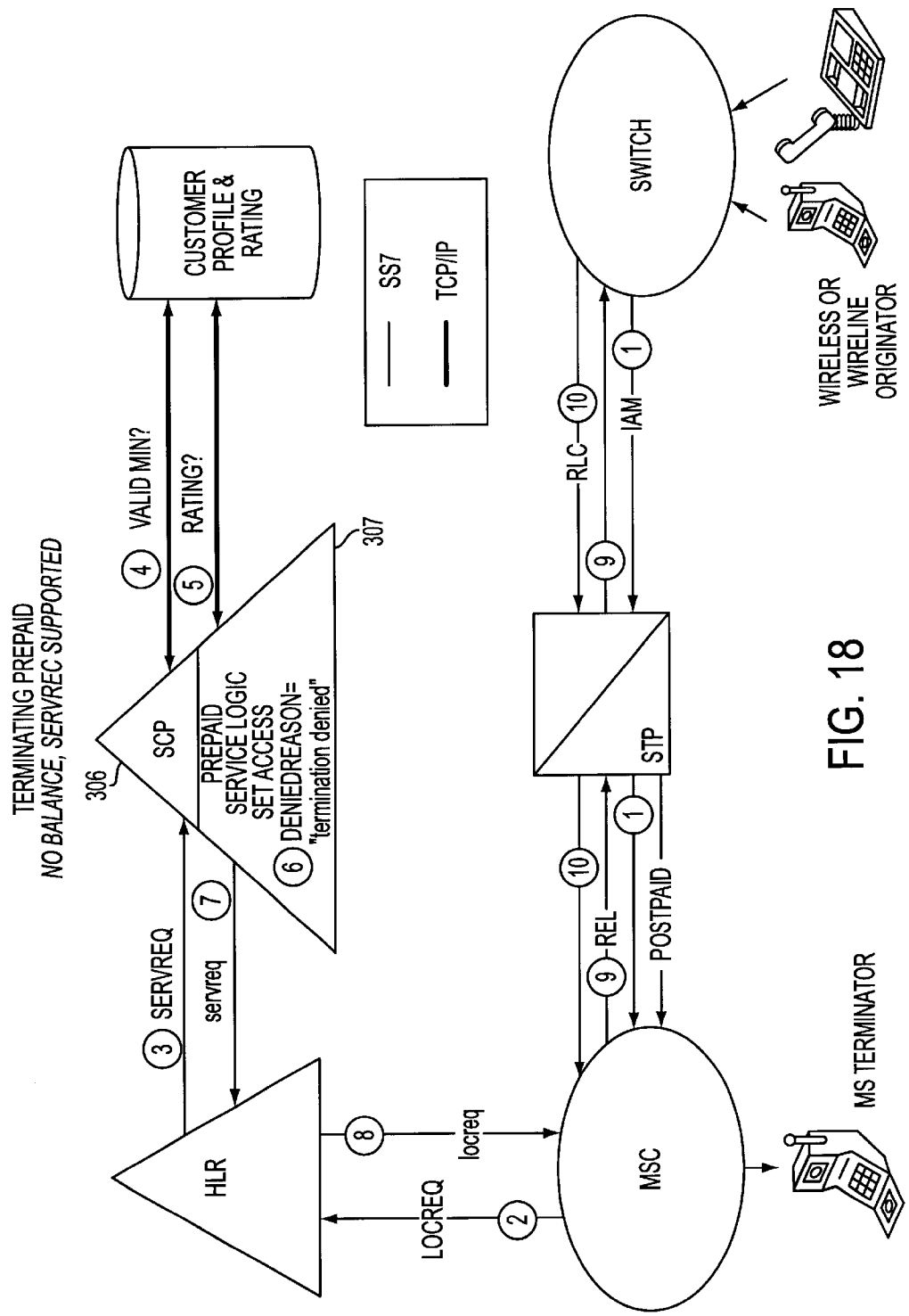
FIG. 18 shows a message sequence for a prepaid call with a wireless device terminating (i.e., receiving) the prepaid call from a wireless or wireline device, in a scenario of no balance remaining on account for the wireless device, and with support for SERVREC, in accordance with the principles of the present invention.

FIG. 18 shows a message sequence for a prepaid call with a wireless device terminating (i.e., receiving) the prepaid call from a wireless or wireline device, in a scenario of no balance remaining on account for the wireless device, and with support for SERVREC, in accordance with the principles of the present invention. In FIG. 18, only copies of relevant ISUP messages need be sent to the prepaid service logic 307.

Figure 19:
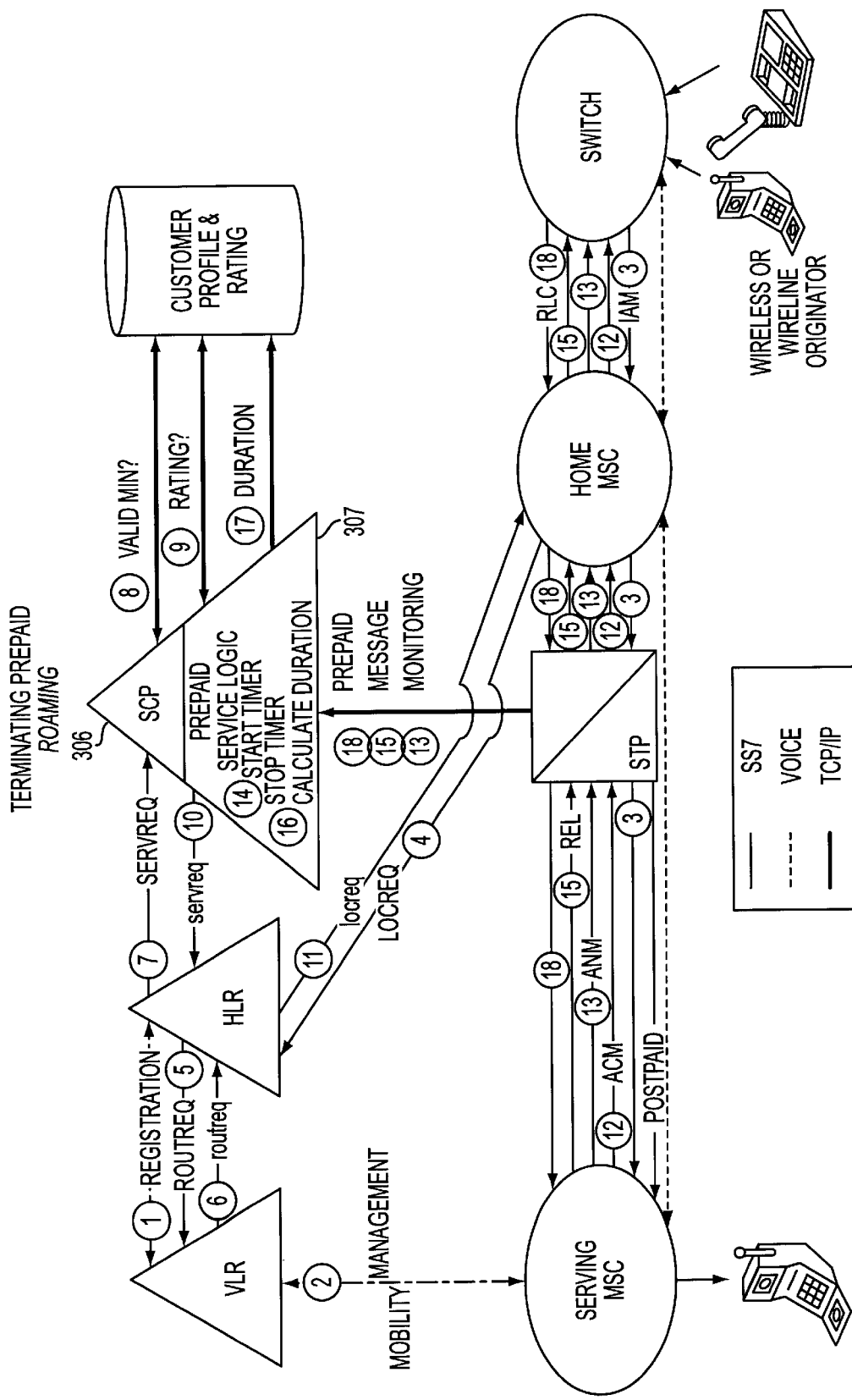
FIG. 19 shows a message sequence for a prepaid call with a wireless device terminating (i.e., receiving) the prepaid call from a wireless or wireline device, when the wireless device is utilizing roaming services, in accordance with the principles of the present invention.

FIG. 19 shows a message sequence for a prepaid call with a wireless device terminating (i.e., receiving) the prepaid call from a wireless or wireline device, when the wireless device is utilizing roaming services, in accordance with the principles of the present invention. In FIG. 19, only copies of relevant ISUP messages need be sent to the prepaid service logic 307, and the gateway STP is within the servicing network.

Figure 20:
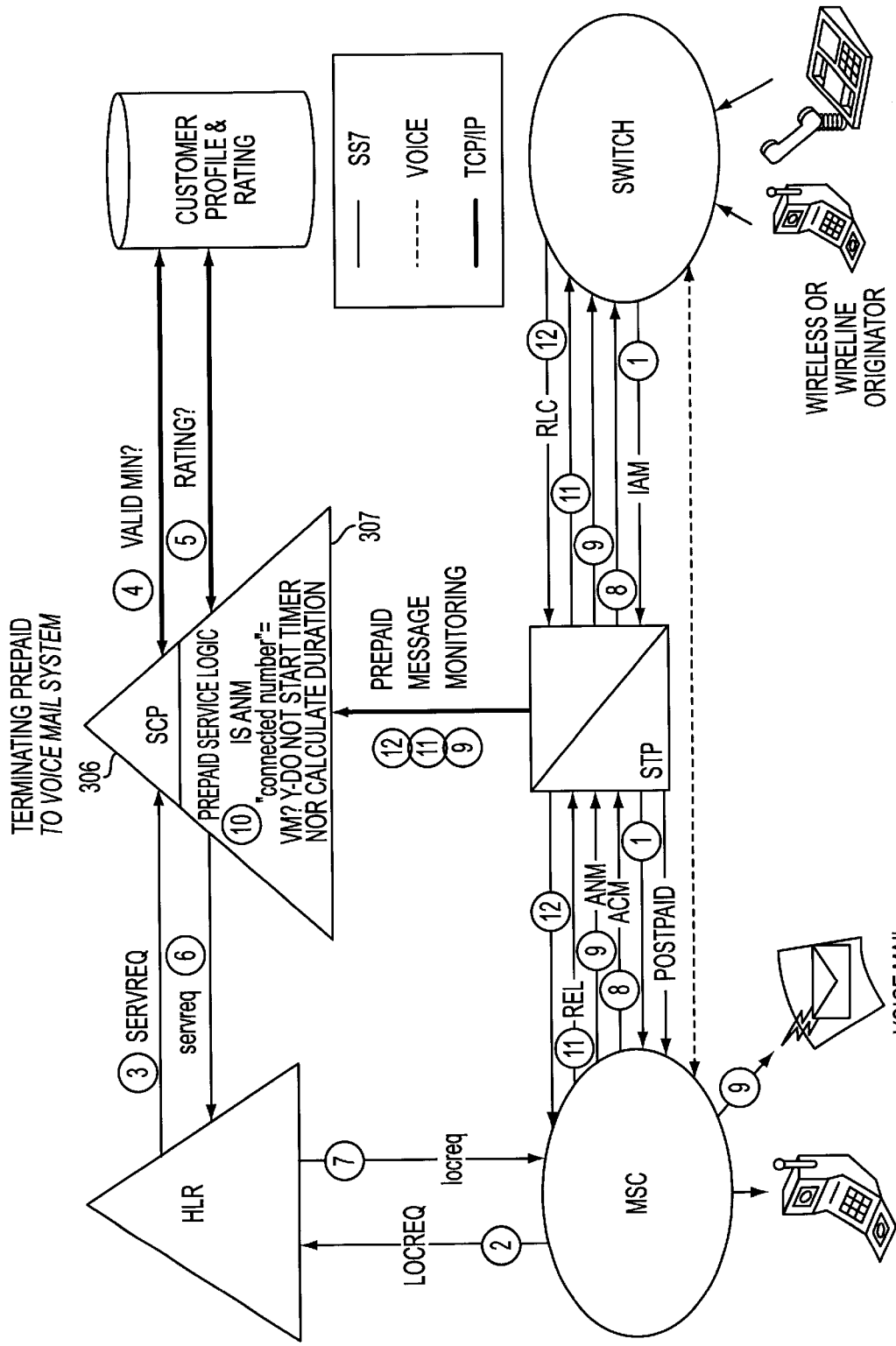
FIG. 20 shows a message sequence for a prepaid call with a wireless device terminating the prepaid call from a wireless or wireline device, with the wireless or wireline device leaving a message in a voice mailbox of the prepaid wireless customer, in accordance with the principles of the present invention.
Figure 21:
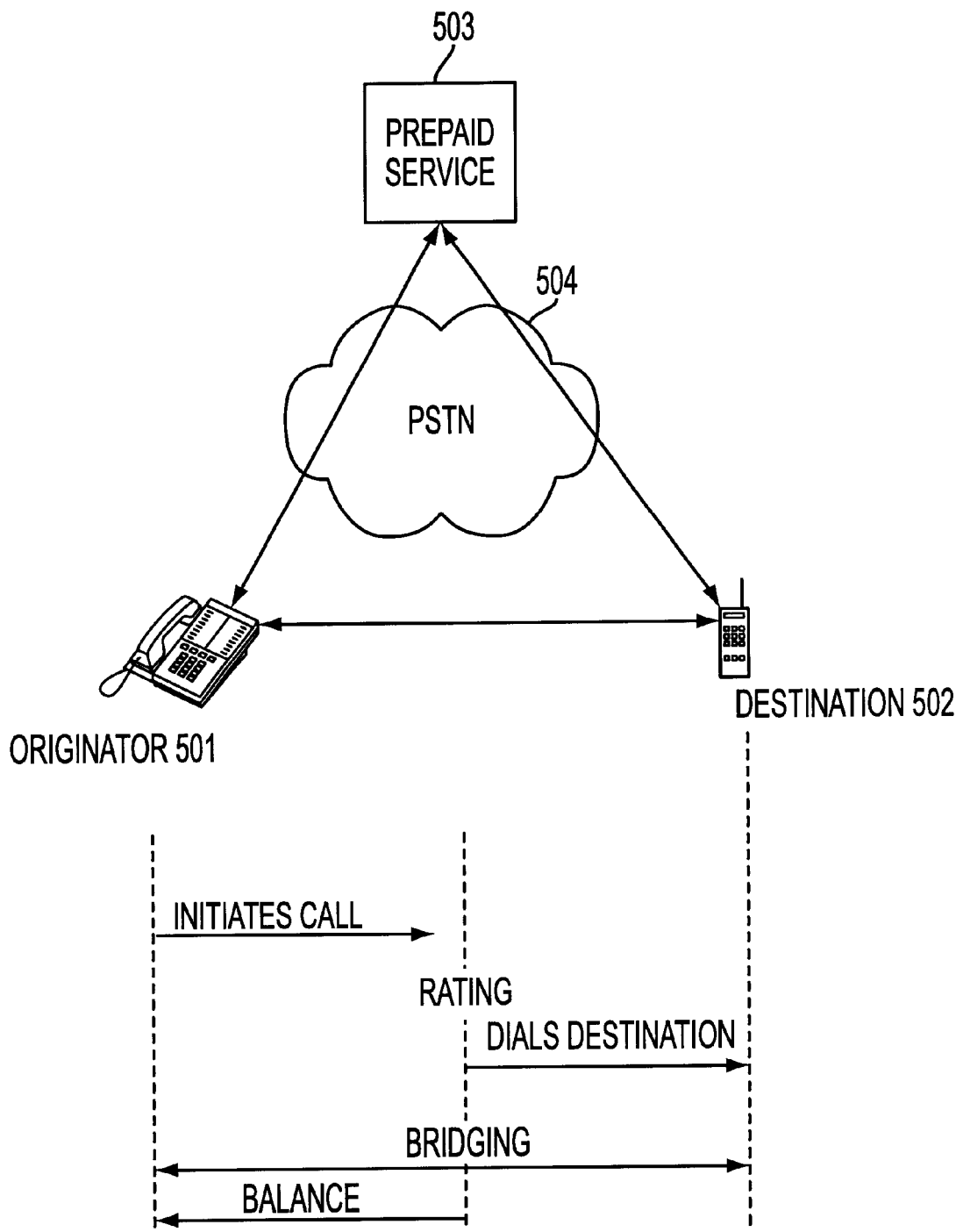
FIG. 21 shows relevant portions of a conventional telephone service network including a prepaid call service.

FIG. 20 shows a message sequence for a prepaid call with a wireless device terminating the prepaid call from a wireless or wireline device, with the wireless or wireline device leaving a message in a voice mailbox of the prepaid wireless customer, in accordance with the principles of the present invention. In FIG. 20, only copies of relevant ISUP messages need be sent to the prepaid service logic 307.

As can be appreciated, the novel network architecture and call management method disclosed above uses the existing triggers and network elements to manage and control special service type calls, e.g., a prepaid call, without the need for costly add-on equipments, and without the need for an extensive modification of the existing network.

While the invention has been described with reference to the exemplary embodiments thereof, those skilled in the art will be able to make various modifications to the described embodiments of the invention without departing from the true spirit and scope of the invention.

What is claimed is:

1. A method of managing a call between an originator and a destination in a telecommunications network, comprising:
   receiving a call initiation from an originator;
   determining one of a plurality of service types associated with a call relating to said call initiation;
   routing call signaling and not said call itself to a service control point if said service type is a prepaid service type, said service control point having a database of profiles of a plurality of subscribers in a telecommunications network; and
   establishing a communication link between said originator and said destination.

2. The method of managing a call between an originator and a destination in a telecommunications network according to claim 1, wherein:
   said communication link is established by exchanging at least one message between said service control point and a service switching point associated with at least one of said originator and said destination.

3. The method of managing a call between an originator and a destination in a telecommunications network according to claim 1, wherein:
   said prepaid service is a prepaid telephone call.

4. The method of managing a call between an originator and a destination in a telecommunications network according to claim 3, wherein:
   said prepaid telephone call is a wireless prepaid telephone call.

5. The method of managing a call between an originator and a destination in a telecommunications network according to claim 1, wherein:
   said at least one message is an ISDN User Part (ISUP) message of Signaling System 7 (SS7).

6. The method of managing a call between an originator and a destination in a telecommunications network according to claim 1, wherein:
   said determination of said service type is made using a Translation Type capability of Signaling Control Connection Part (SCCP) layer of Signaling System 7 (SS7).

7. The method of managing a call between an originator and a destination in a telecommunications network according to claim 1, wherein:
   said profiles include prepaid account balance information relating to respective ones of said plurality of subscribers.

8. The method of managing a call between an originator and a destination in a telecommunications network according to claim 7, further comprising:
   transmitting a message to said originator, said message including prepaid account balance information relating to said originator.

9. The method of managing a call between an originator and a destination in a telecommunications network according to claim 8, wherein:
   said message is transmitted substantially immediately after a termination of a prepaid service call.

10. The method of managing a call between an originator and a destination in a telecommunications network according to claim 7, further comprising:
    transmitting a message to said destination, said message including prepaid account balance information relating to said destination.

11. The method of managing a call between an originator and a destination in a telecommunications network according to claim 10, wherein:
    said message is transmitted substantially immediately after a termination of a prepaid service call.

12. Apparatus for managing a call between an originator and a destination in a telecommunications network, comprising:
    means for receiving a call initiation from an originator;
    means for determining one of a plurality of service types associated with a call relating to said call initiation;
    means for routing call signaling and not said call itself to a service control point if said service type is a prepaid service type, said service control point having a database of profiles of a plurality of subscribers in a telecommunications network; and
    means for establishing a communication link between said originator and said destination.

13. The apparatus for managing a call between an originator and a destination in a telecommunications network according to claim 12, wherein:
    said means for establishing said communication link establishes said communication link by exchanging at least one message between said service control point and a service switching point associated with at least one of said originator and said destination.

14. The apparatus for managing a call between an originator and a destination in a telecommunications network according to claim 12, wherein:
    said prepaid service is a prepaid telephone call.

15. The apparatus for managing a call between an originator and a destination in a telecommunications network according to claim 14, wherein:
    said prepaid telephone call is a wireless prepaid telephone call.

16. The apparatus for managing a call between an originator and a destination in a telecommunications network according to claim 12, wherein:

said at least one message is an ISDN User Part (ISUP) message of Signaling System 7 (SS7).

17. The apparatus for managing a call between an originator and a destination in a telecommunications network according to claim 12, wherein:

said determination of said service type is made using a Translation Type capability of Signaling Control Connection Part (SCCP) layer of Signaling System 7 (SS7).

18. The apparatus for managing a call between an originator and a destination in a telecommunications network according to claim 12, wherein:

said profiles include prepaid account balance information relating to respective ones of said plurality of subscribers.

19. The apparatus for managing a call between an originator and a destination in a telecommunications network according to claim 18, further comprising:

means for transmitting a message to said originator, said message including prepaid account balance information relating to said originator.

20. The apparatus for managing a call between an originator and a destination in a telecommunications network according to claim 19, wherein:

said means for transmitting transmits said message substantially immediately after a termination of a prepaid service call.

21. A telecommunications intelligent network, comprising:

a service control point having a database of profiles relating to a plurality of users of a telecommunications intelligent network;

at least one service transfer point adapted to determine a service type associated with a call between an originator and a destination, and to route call signaling and not said call itself to said service control point if said service type is a prepaid service type; and at least one of a service switching point and a mobile switching center adapted to communicate with said service control point to establish a communication link between said originator and said destination.

22. The telecommunications intelligent network according to claim 21, wherein:

said service control point and said service switching point are adapted to communicate with each other using ISDN User Part (ISUP) messages of Signaling System 7 (SS7).

23. The telecommunications intelligent network according to claim 21, wherein:

said service transfer point is adapted to determine said service type using a Translation Type capability of Signaling Control Connection Part (SCCP) layer of Signaling System 7 (SS7).

24. The telecommunications intelligent network according to claim 21, wherein:

said profiles include prepaid account balance information relating to respective ones of said plurality of subscribers.

25. The telecommunications intelligent network according to claim 23, wherein:

said service control point is adapted to transmit a message to said originator, said message including prepaid account balance information relating to said originator.

26. The telecommunications intelligent network according to claim 24, wherein:

said message is transmitted substantially immediately after a termination of a repaid call service call.

27. The telecommunications intelligent network according to claim 23, wherein:

said service control point is adapted to transmit a message to said destination, said message including prepaid account balance information relating to said destination.

28. The telecommunications intelligent network according to claim 26, wherein:

said message is transmitted substantially immediately after a termination of a prepaid call service call.

29. The service control point in a telecommunications intelligent network according to claim 28, wherein:

said prepaid service logic is adapted exchange said at least one message with said service switching point using ISDN User Part (ISUP) messages of Signaling System 7 (SS7).

30. The service control point in a telecommunications intelligent network according to claim 29, wherein:

said message is transmitted substantially immediately after a termination of a prepaid call service call.

31. A service control point in a telecommunications intelligent network, comprising:

a database of profiles of a plurality of subscribers of a telecommunications intelligent network; and prepaid service logic adapted to exchange call signaling and not said call itself with a service control point to establish a communication link between a service switching point and a mobile switching center of said telecommunications intelligent network for a predetermined service type call for at least one of said plurality of subscribers, said establishment of said communication link being based on account balance information of said at least one subscriber stored in said database.

32. The service control point in a telecommunications intelligent network according to claim 31, wherein:

said prepaid service logic is adapted to transmit a message to said at least one subscriber, said message including prepaid account balance information regarding said at least one subscriber.

33. A signal transfer point in a telecommunications intelligent network, comprising:

means for determining whether a call initiated by a caller requires one of a prepaid call service and a postpaid call service, said determination being based on Translation Type mapping capability of at least one of a Signaling Control Connection Part (SCCP) layer of Signaling System 7 (SS7) and SS7 User Part (ISUP) messaging.

34. A method of providing a signal transfer point in a telecommunications intelligent network, comprising:

determining whether a call initiated by a caller requires one of a prepaid call service and a postpaid call service;

wherein said determination is based on a Translation Type capability of Signaling Control Connection Part (SCCP) layer of Signaling System 7 (SS7).

* * * * *